US012699405B2

(12) United States Patent
Iwahori et al.

(10) Patent No.: US 12,699,405 B2
(45) Date of Patent: Aug. 4, 2026

(54) CONTROL SYSTEM, MOBILE OBJECT, AND CONTROL METHOD

(71) Applicant: TOYOTA JIDOSHA KABUSHIKI KAISHA, Toyota (JP)

(72) Inventors: Kento Iwahori, Nagoya (JP); Noritsugu Iwazaki, Sunto-gun (JP); Go Inoue, Gotenba (JP); Takeshi Kanou, Seto (JP); Yuki Okamoto, Ebina (JP); Jyunya Katou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 18/801,914

(22) Filed: Aug. 13, 2024

(65) Prior Publication Data

US 2025/0147521 A1      May 8, 2025

(30) Foreign Application Priority Data

Sep. 29, 2023 (JP) ................................. 2023-169300
Jan. 11, 2024 (JP) ................................. 2024-002215

(51) Int. Cl.
G05D 1/661 (2024.01)
B62D 65/18 (2006.01)
G05D 107/70 (2024.01)

(52) U.S. Cl.
CPC ............. G05D 1/663 (2024.01); B62D 65/18 (2013.01); *G05D 2107/70* (2024.01)

(58) Field of Classification Search
CPC .... G05D 1/663; G05D 2107/70; B62D 65/18; G05B 19/41815; B65G 1/00; B65G 37/00

USPC .......................................................... 701/23
See application file for complete search history.

(56) References Cited

U.S. PATENT DOCUMENTS

| | | | |
|---|---|---|---|
| 2005/0207876 A1 | 9/2005 | Springwater | |
| 2009/0065330 A1* | 3/2009 | Lupton | ................ B65G 47/684 |
| | | | 700/223 |
| 2017/0320529 A1 | 11/2017 | Nordbruch | |
| 2018/0111791 A1 | 4/2018 | Fang | |
| 2019/0256300 A1* | 8/2019 | Shimamura | ............ B25J 9/0093 |
| 2020/0142387 A1* | 5/2020 | Wahrén | .............. G05B 19/4185 |
| 2024/0228163 A1* | 7/2024 | Taniguchi | .............. B65G 43/08 |

FOREIGN PATENT DOCUMENTS

| | | | | |
|---|---|---|---|---|
| CA | 2844967 C | * | 2/2016 | ............. B65G 43/08 |
| DE | 10 2020 102 113 A1 | | 7/2021 | |
| EP | 3418834 A1 | * | 12/2018 | ......... G05B 19/4189 |
| EP | 3527335 A1 | * | 8/2019 | ................ B25J 9/10 |
| JP | 2017-538619 A | | 12/2017 | |
| JP | 2020-187483 A | | 11/2020 | |

* cited by examiner

*Primary Examiner* — Tuan C To
(74) *Attorney, Agent, or Firm* — Oblon, McClelland, Maier & Neustadt, L.L.P.

(57) ABSTRACT

A control system is configured to control movement of a mobile object that is configured to be conveyed by unmanned driving at least in a manufacturing process, and the control system includes: a stop position identification section configured to identify a stop position at which the mobile object is stopped on a conveying part of a conveyance apparatus including the conveying part configured to convey the mobile object; and a control command section configured to generate and output a control command to cause the mobile object to enter the conveying part according to the stop position.

8 Claims, 9 Drawing Sheets

Figure 5:
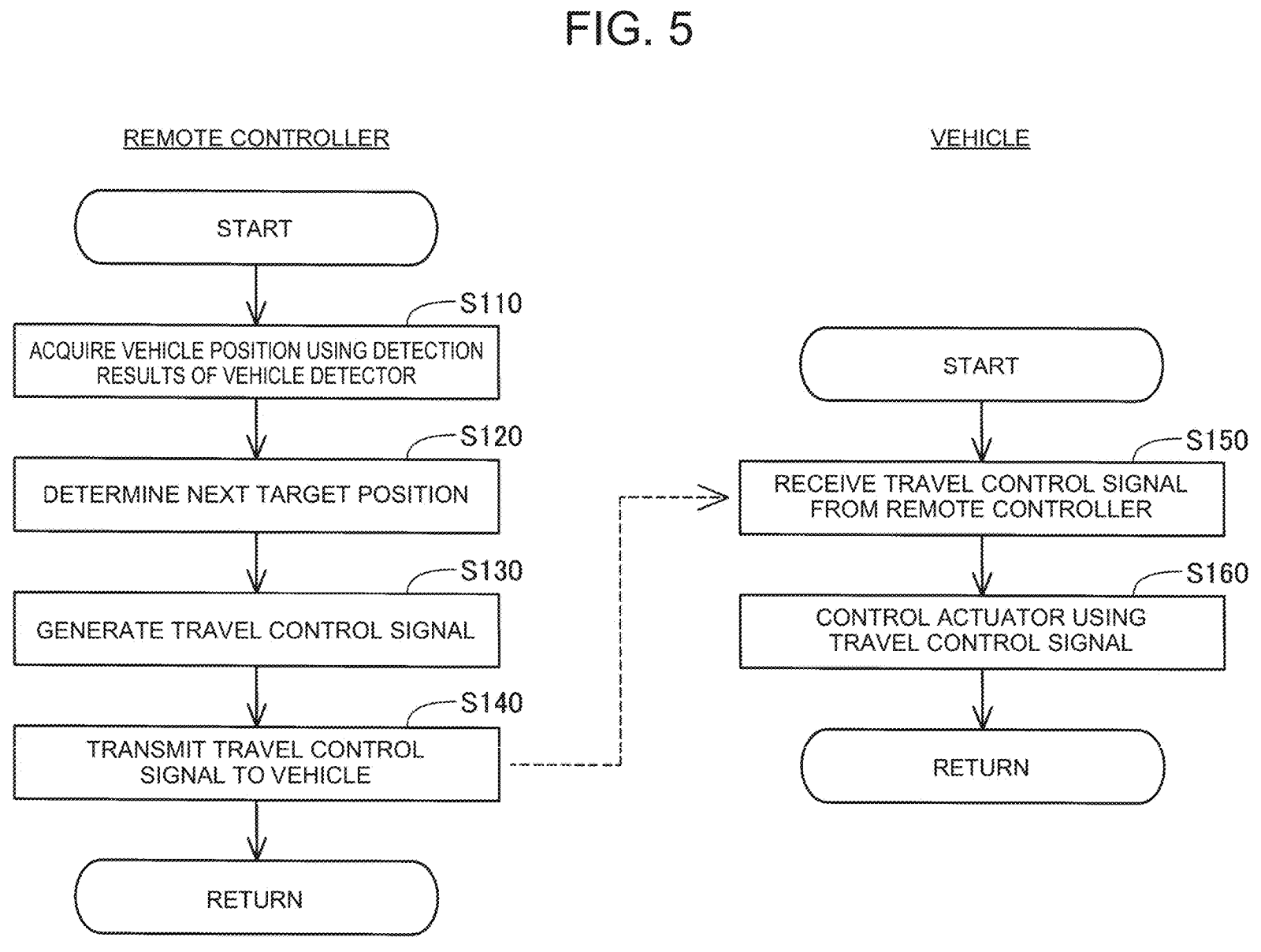

VEHICLE

START

RECEIVE TRAVEL CONTROL SIGNAL
FROM REMOTE CONTROLLER          S150

CONTROL ACTUATOR USING
TRAVEL CONTROL SIGNAL          S160

RETURN

REMOTE CONTROLLER

START

ACQUIRE VEHICLE POSITION USING DETECTION
RESULTS OF VEHICLE DETECTOR          S110

DETERMINE NEXT TARGET POSITION          S120

GENERATE TRAVEL CONTROL SIGNAL          S130

TRANSMIT TRAVEL CONTROL
SIGNAL TO VEHICLE          S140

RETURN

VEHICLE

START

ACQUIRE POSITION INFORMATION ON
VEHICLE USING DETECTION RESULTS
OF VEHICLE DETECTOR — S310

DETERMINE NEXT TARGET POSITION — S320

GENERATE TRAVEL CONTROL SIGNAL — S330

CONTROL ACTUATOR USING
TRAVEL CONTROL SIGNAL — S340

RETURN

CONTROL SYSTEM, MOBILE OBJECT, AND CONTROL METHOD

CROSS-REFERENCE TO RELATED APPLICATION

This application claims priority to Japanese Patent Application No. 2023-169300 filed on Sep. 29, 2023 and Japanese Patent Application No. 2024-002215 filed on Jan. 11, 2024, each incorporated herein by reference in its entirety.

BACKGROUND

1. Technical Field

The present disclosure relates to a control system, a mobile object, and a control method.

2. Description of Related Art

In manufacturing systems for manufacturing vehicles, there are known technologies that use both conveyance methods of conveying vehicles using belts and of conveying vehicles using vehicle traveling by remote control. For example, Japanese Unexamined Patent Application Publication (Translation of PCT Application) No. 2017-538619 discloses a technology that executes a manufacturing process while a vehicle is being conveyed by a belt, and when the manufacturing process is completed, the vehicle is caused to travel to a parking lot by remote control.

SUMMARY

Unfortunately, in JP 2017-538619 A, consideration is given only to the configuration to perform the conveyance of the vehicle using vehicle traveling by remote control after the conveyance of the vehicle using the belt, and no consideration is given to a configuration to perform the conveyance of the vehicle using the belt after the conveyance of the vehicle using vehicle traveling by remote control. There is a problem that, at the time of entering the conveyance apparatus using the belt, the stop position is changed after the vehicle has entered the conveyance apparatus, due to the processing state of delay or progress of another vehicle ahead, or interruption of another vehicle that is conveyed by driving of a worker. This problem is common not only to vehicles but also to any type of mobile object. The problem is common not only to vehicle conveyance using a belt but also to any type of conveyance method that conveys mobile objects by applying external force.

The present disclosure can be realized as the following aspects.

One aspect of the present disclosure provides a control system configured to control movement of a mobile object that is configured to be conveyed by unmanned driving at least in a manufacturing process. This control system includes: a stop position identification section configured to identify a stop position at which the mobile object is stopped on a conveying part of a conveyance apparatus including the conveying part configured to convey the mobile object; and a control command section configured to generate and output a control command to cause the mobile object to enter the conveying part according to the stop position.

According to the control system of this aspect, the control system identifies the stop position of the mobile object on the conveying part, and generates and outputs a control command to cause the mobile object to enter the conveying part according to the stop position. Accordingly, even in the case in which the stop position is changed after the mobile object has entered the conveyance apparatus, due to the processing state of delay or progress of another mobile object ahead, or interruption of another mobile object that is conveyed by the worker's driving, it is possible to appropriately cause the mobile object to enter the conveying part.

The stop position identification section may identify the stop position by using at least one of control information indicating a control state of the conveyance apparatus and obstacle information indicating presence or absence of an obstacle on the conveying part.

According to the control system of this aspect, at least one of the control information indicating the control state of the conveyance apparatus and the obstacle information indicating presence or absence of an obstacle on the conveying part is used to identify the stop position; therefore, it is possible to appropriately identify the stop position according to the conveyance state of the conveyance apparatus, which is indicated by at least one of the control information and the obstacle information.

The stop position identification section may be configured to: identify a plurality of candidate stop positions that are a plurality of candidates of the stop position by using the control information; and identify the stop position among the plurality of candidate stop positions by using the obstacle information.

According to the control system of this aspect, the control information is used to identify a plurality of candidate stop positions, and the obstacle information is used to identify the stop position among the plurality of candidate stop positions; therefore, compared to the configuration to identify the stop position by using only one of the control information and the obstacle information, it is possible to more appropriately identify the stop position.

The mobile object may include one or more wheels for moving. The stop position identification section may be configured to: identify positions of a plurality of wheel stops provided on the conveying part by using the control information; identify, as the plurality of candidate stop positions, positions corresponding to a preset number of consecutive wheel stops, which are counted by the preset number from a conveyance start position where the conveyance of the mobile object (100) by the conveying part is started, among the plurality of wheel stops; identify presence or absence of the obstacle at each of the candidate stop positions using the obstacle information; and identify the stop position among the plurality of candidate stop positions according to the presence or absence of the obstacle. The stop position identification section may be configured to: when no obstacle is present at any one of the candidate stop positions, identify, as the stop position, the candidate stop position that is located farthest from the conveyance start position among the plurality of candidate stop positions; and when the obstacle is present at any one of the candidate stop positions, identify, as the stop position, the candidate stop position located immediately before the candidate stop position at which the obstacle located closest to the conveyance start position is present as viewed from the conveyance start position, among the plurality of candidate stop positions.

According to the control system of this aspect, when no obstacle is present at any one of the candidate stop positions, among the plurality of candidate stop positions, a candidate stop position located farthest from the conveyance start position is identified as the stop position; and when an obstacle is present at any one of the candidate stop positions, among the plurality of candidate stop positions, the candidate stop position, immediately before the candidate stop position at which the obstacle located closest to the conveyance start position is present as viewed from the conveyance start position, is identified as the stop position. Accordingly, it is possible to prevent the distance between the obstacle on the conveying part and the stop position from increasing more than necessary, thereby reducing deterioration of conveyance efficiency of the mobile object by the conveyance apparatus.

The control command section may be configured to generate and output a control command to control at least one of timing of causing the mobile object to enter the conveying part and a speed of the mobile object.

According to the control system of this aspect, a control command to control at least one of timing of causing the mobile object to enter the conveying part and a speed of the mobile object is generated and output; therefore, it is possible to cause the mobile object to enter the conveying part at an appropriate timing.

The control command section may be configured to generate and output a control command to cause the mobile object to enter the conveying part when a distance between the conveyance start position at which the conveyance of the mobile object by the conveying part is started and the stop position is larger than a preset threshold value.

According to the control system of this aspect, when the distance between the stop position and the conveyance start position is larger than a preset threshold value, the control command to cause the mobile object to enter the conveying part is generated and output; therefore, it is possible to cause the mobile object to enter the conveying part at a timing of securing a sufficient space for mounting the mobile object on the conveying part. Accordingly, it is possible to prevent the mobile object from entering the conveying part without securing a sufficient space for mounting the mobile object on the conveying part and from being mounted and conveyed on the conveying part while the mobile object overhangs from the conveying part, thereby preventing the mobile object from being damaged.

The control command section may be configured to generate and output a control command to stop the mobile object for a preset time when a distance between the conveyance start position at which the conveyance of the mobile object by the conveying part is started and the stop position is equal to or less than a preset threshold value.

According to the control system of this aspect, when the distance between the stop position and the conveyance start position is equal to or less than the preset threshold, the control command to stop the mobile object for a preset time is generated and output; therefore, it is possible to cause the mobile object to wait until a sufficient space for mounting the mobile object on the conveying part is secured. Accordingly, it is possible to prevent the mobile object from entering the conveying part without securing a sufficient space for mounting the mobile object on the conveying part and from being mounted and conveyed on the conveying part while the mobile object overhangs from the conveying part, thereby preventing the mobile object from being damaged.

The control command section may be configured to generate and output a control command to stop movement of the mobile object depending on a state of the mobile object on the conveying part.

The control system may further include: a conveyance control section configured to stop driving of the mobile object by the conveying part depending on a state of the mobile object on the conveying part.

Another aspect of the present disclosure provides a controller configured to control movement of a mobile object that is configured to be conveyed by unmanned driving at least in a manufacturing process. This controller includes: a stop position identification section configured to identify a stop position at which the mobile object is stopped on a conveying part of a conveyance apparatus including the conveying part configured to convey the mobile object; and a control command section configured to generate and output a control command to cause the mobile object to enter the conveying part according to the stop position.

According to the controller of this aspect, this controller identifies the stop position of the mobile object on the conveying part, and generates and outputs a control command to cause the mobile object to enter the conveying part according to the stop position. Accordingly, even in the case in which the stop position is changed after the mobile object has entered the conveyance apparatus, due to the processing state of delay or progress of a mobile object ahead, or interruption of another vehicle that is conveyed by the worker's driving, it is possible to appropriately cause the mobile object to enter the conveying part.

Another aspect of the present disclosure provides a mobile object configured to travel by unmanned driving. This mobile object includes: a stop position identification section configured to identify a stop position at which the mobile object is stopped on a conveying part of a conveyance apparatus including the conveying part configured to convey the mobile object; and a control command section configured to generate and output a control command to cause the mobile object to enter the conveying part according to the stop position.

According to the mobile object of this aspect, the stop position of the mobile object on the conveying part is identified, and a control command to cause the mobile object to enter the conveying part according to the stop position is generated and output. Accordingly, even in the case in which the stop position is changed after the mobile object has entered the conveyance apparatus, due to the processing state of delay or progress of a vehicle ahead, or interruption of another vehicle that is conveyed by the worker's driving, it is possible to appropriately cause the entry into the conveying part.

Another aspect of the present disclosure provides a control method that controls movement of a mobile object that is configured to be conveyed by unmanned driving at least in a manufacturing process. This control method includes: identifying a stop position at which the mobile object is stopped on a conveying part of a conveyance apparatus including the conveying part configured to convey the mobile object; and generating and outputting a control command to cause the mobile object to enter the conveying part according to the stop position.

According to the control method of this aspect, the control method identifies the stop position of a mobile object on the conveying part, and generates and outputs a control command to cause the mobile object to enter the conveying part according to the stop position. Accordingly, even in the case in which the stop position is changed after the mobile object has entered the conveyance apparatus, due to the processing state of delay or progress of a vehicle ahead, or interruption of another vehicle that is conveyed by the worker's driving, it is possible to appropriately cause the mobile object to enter the conveying part.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is an explanatory view showing a schematic configuration of a conveyance system as a control system of the first embodiment;

FIG. 5 is a flowchart showing a method of causing the vehicle to travel of the first embodiment;

DETAILED DESCRIPTION OF EMBODIMENTS

First Embodiment

System Configuration

Figure 1:
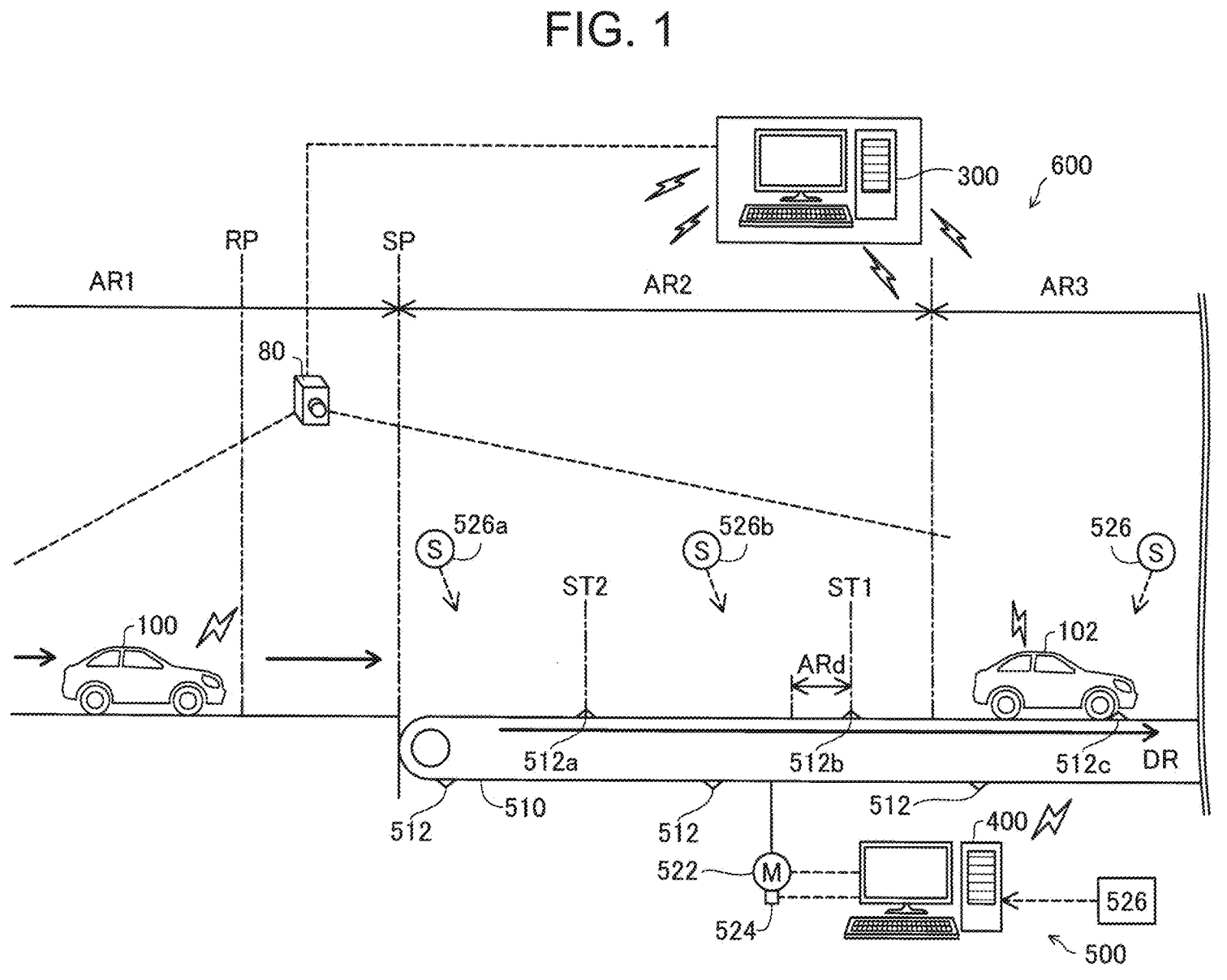

FIG. 1 is an explanatory view showing the schematic configuration of a conveyance system 600 as a control system of the first embodiment. The conveyance system 600 is used in a factory where a vehicle 100 is manufactured, for example. A conveyance target of the conveyance system 600 is the vehicle 100 that can travel by remote control. The conveyance system 600 is used in the manufacturing process of the vehicle 100, such as an inspection process and an assembly process of the vehicle 100, for example, and conveys the vehicle 100 through a conveyance section preset in the manufacturing process. The vehicle 100 during the conveyance is subjected to processing of inspection, assembly, and others carried by workers, equipment, etc. The conveyance system 600 may also be used when conveying the vehicle 100 having been finished after the manufacturing process to a stand-by area to await shipping.

Figure 2:
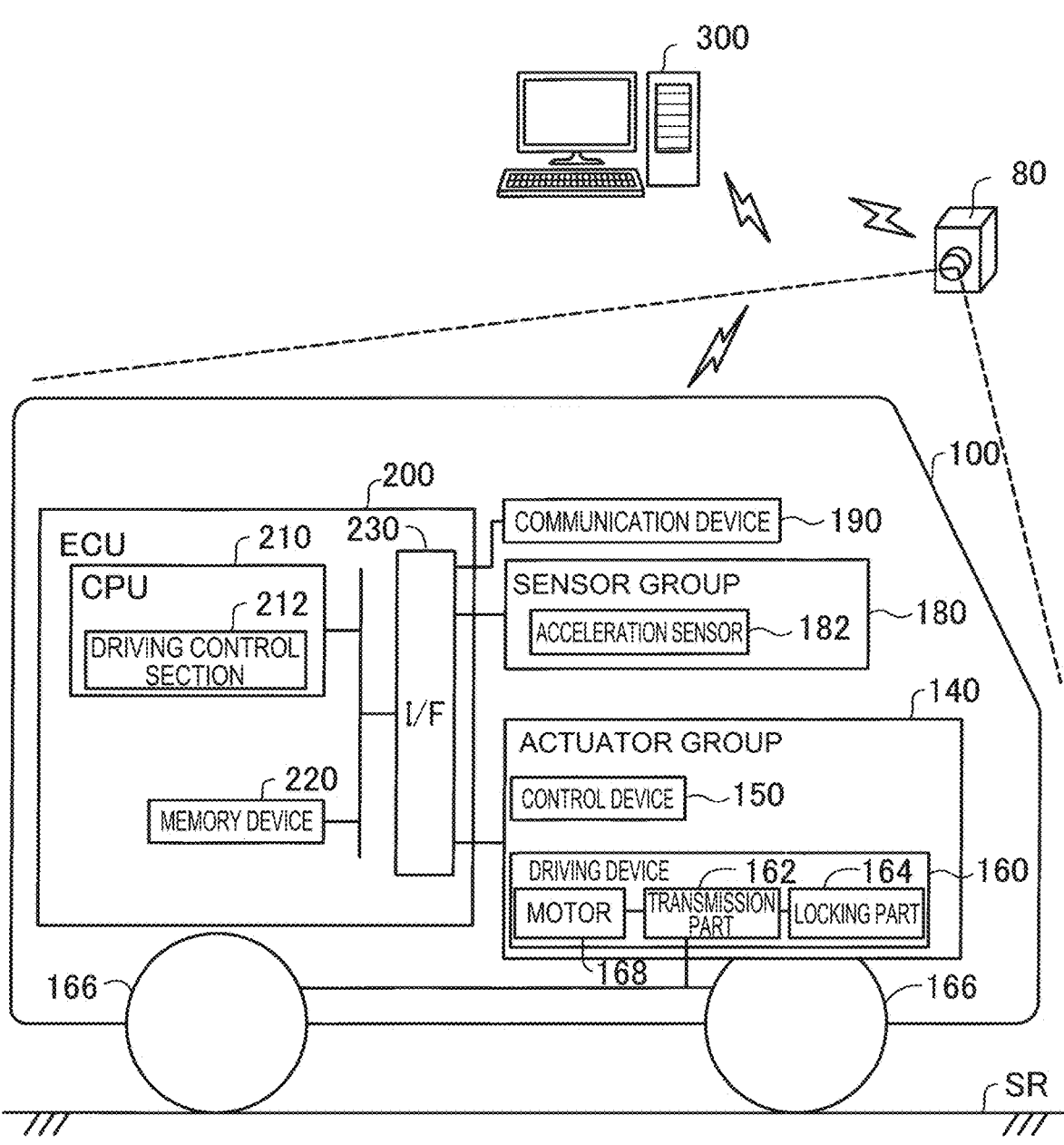
FIG. 2 is a block diagram showing a schematic configuration of a vehicle of the first embodiment.

FIG. 2 is a block diagram showing the schematic configuration of the vehicle 100 of the first embodiment. The vehicle 100 is a passenger vehicle, a truck, a bus, a construction vehicle, or the like, for example. In the present embodiment, the vehicle 100 is a battery electric vehicle (BEV), which can travel by unmanned driving. "Unmanned driving" means driving without relying on driving operation by an occupant. Driving operation means operation regarding at least one of "traveling", "turning", or "stopping" of the vehicle. The unmanned driving can be realized by automatic or manual remote control using devices provided outside the vehicle or by autonomous control on the vehicle. An occupant free from driving operation may get in the vehicle traveling by the unmanned driving. The occupant free from driving operation may include a person who is simply seated in a vehicle seat or a person who performs a task different from the driving operation, such as assembling, inspecting, or switching operation while getting in the vehicle. Driving by driving operation of an occupant might be referred to as "manned driving". The vehicle 100 includes a communication device 190, an actuator group 140, a sensor group 180, and an electronic control unit (ECU) 200.

The ECU 200 is installed in the vehicle 100, and executes various controls on the vehicle 100. The ECU 200 includes: a memory device 220, such as an HDD (hard disk drive), an SSD (solid state drive), optical storage media, semiconductor memories, etc.; a CPU 210 as a central processing unit; and an interface circuit 230. The CPU 210, the memory device 220, and the interface circuit 230 are connected so as to be bidirectionally communicable with each other via an internal bus. The actuator group 140, the sensor group 180, and the communication device 190 are connected to the interface circuit 230. The communication device 190 performs wireless communication with external devices of the vehicle 100 that are connected to the network, such as a remote controller 300, via access points, etc. in the factory.

Computer programs to realize at least some of functions provided in the present embodiment are stored in the memory device 220. The CPU 210 executes various computer programs stored in the memories, thereby realizing the functions, such as a driving control section 212.

The driving control section 212 executes driving control on the vehicle 100. The "driving control" includes, for example, various controls to drive the actuator group 140, and the actuator group 140 exerts functions of "traveling", "turning", and "stopping" of the vehicle 100, regarding adjustments of acceleration, speed, and a steering angle, etc. In the present embodiment, the actuator group 140 includes: an actuator of a driving device 160 that accelerates the vehicle 100, an actuator of a braking device 170 that decelerates the vehicle 100, and an actuator of a not-shown steering device that changes a traveling direction of the vehicle 100. The actuator group 140 may also include an actuator that swings wipers of the vehicle 100, and an actuator that opens and closes power windows of the vehicle 100. The actuator group 140 may also include an actuator that turns on and off not-shown lamps and others of the vehicle 100, and an actuator that sounds a not-shown alarm (horn).

The actuator of the driving device 160 includes: a not-shown driving battery; a traveling motor 168 driven by electric power of the driving battery; four wheels 166; a transmission part 162; and a locking part 164. The traveling motor 168 is an example of a motor. The wheels 166 are rotated by power transmitted from the traveling motor 168. In place of the traveling motor 168, another type of a prime mover, such as an internal or external combustion engine, may be installed.

The transmission part 162 includes a transmission mechanism, such as gears and shafts, and transmits power from the traveling motor 168 to the wheels 166. The locking part 164 performs switching between a non-fixed state and a fixed state of locking the transmission mechanism of the transmission part 162. In the present embodiment, the locking part 164 is an electric parking brake (EPB) that is operable by remote control. When the function of the transmission part 162 is switched to a "P range" by the remote control of the remote controller 300 or by lever operation of an occupant in the vehicle 100, etc., the locking part 164 is switched to the fixed state and the wheels 166 are locked not to be rotatable. When switched to an "N range", gears and others in the transmission mechanism of the transmission part 162 are brought into an unconnected state, so that no power from the traveling motor 168 is transmitted to the wheels 166. In the N range, the wheels 166 are in an idling-ready state. The term "idling" means a state in which the wheels 166 are capable of so-called idling. During idling, the vehicle 100 cannot travel a distance corresponding to the amount of rotation of the wheels 166 even by rotating the wheels 166. A "D range" is a state in which the locking part 164 is in the non-fixed state and the gears and others of the transmission mechanism of the transmission part 162 are connected. In the D range, the power from the traveling motor 168 is transmitted by the transmission part 162 to the wheels 166, and the vehicle 100 is in a state of being able to travel.

When a driver is present in the vehicle 100, the driving control section 212 can cause the vehicle 100 to travel by controlling the actuator group 140 according to the operation by the driver. The driving control section 212 can also cause the vehicle 100 to travel by controlling the actuator group 140 in response to a control command transmitted from the remote controller 300, regardless of whether or not the driver is present in the vehicle 100.

The sensor group 180 includes a general type of sensors used for the driving control on the vehicle 100. In the present embodiment, the sensor group 180 includes an acceleration sensor 182 that detects impact and others against the vehicle 100. Measurement results by the sensor group 180 are transmitted to the ECU 200.

As shown in FIG. 1, the conveyance system 600 includes a vehicle detector 80, a conveyance apparatus 500, and a remote controller 300. The vehicle detector 80 is a device for measuring vehicle information. The "vehicle information" is information used for estimating at least one of the position of the vehicle 100 and the direction of the vehicle 100, such as an image of the vehicle 100 and 3D point cloud data of the vehicle 100, for example. "3D point cloud data" is data indicating a 3D position of a point cloud. In the present embodiment, light detection and ranging (LiDAR) serving as a distance measuring device is used for the vehicle detector 80. The vehicle detector 80 measures 3D point cloud data of the vehicle 100 as the vehicle information. By using LiDAR, highly accurate 3D point cloud data can be acquired.

The vehicle detector 80 is communicably connected to the remote controller 300 via wireless or wired communication. By acquiring the vehicle information from the vehicle detector 80, the remote controller 300 can acquire the position and the orientation of the vehicle 100 relative to a target route in real time.

The conveyance apparatus 500 includes a conveying part 510, a motor 522, an encoder 524, a plurality of conveyed object detectors 526, and a conveyance controller 400.

The conveying part 510 is driven by the motor 522 so as to convey the vehicle 100 as a conveyance target toward a conveyance direction DR at a preset conveyance speed. In FIG. 1, only one end of the conveying part 510 is illustrated, and an illustration of the other end thereof is omitted. In the present embodiment, the conveying part 510 is a belt conveyor with an annular endless belt. The conveying part 510 includes a plurality of wheel stops 512 arranged with preset intervals. The conveying part 510 can mount one vehicle 100 in each section defined between two wheel stops 512 adjacent to each other, and conveys the vehicle 100 mounted on the conveying part 510. The vehicle 100 on the conveying part 510 can leave the conveying part 510 at any timing by remote control of the remote controller 300. In the present embodiment, the conveying part 510 is continuously driven regardless of whether or not the vehicle 100 is present on the conveying part 510. The conveyance apparatus 500 can move the vehicle 100 through a predetermined conveyance section not by remote control or by driving control on the vehicle 100, but by the conveying part 510. The conveying part 510 is not limited only to a belt conveyor but also to a variety of conveyors capable of conveying the vehicle 100, such as a roller conveyor, a chain conveyor, and others. The conveying part 510 may be configured to be driven not only continuously but also be driven only when the vehicle 100 is mounted on the conveying part 510. The conveying part 510 may be configured to convey not only the vehicle 100 but also components of the vehicle 100 together with the vehicle 100. A worker or workers who perform processing on the vehicle 100 might get on the conveying part 510 in some cases.

The conveyed object detector 526 may include a variety of detectors capable of detecting presence or absence of a target, such as cameras, infrared sensors, ultrasonic sensors, millimeter wave radars, and others, for example. The conveyed object detector 526 detects the vehicle 100 on the conveying part 510. The conveyed object detector 526 may detect not only the vehicle 100 but also any conveyed object conveyed by the conveying part 510, such as a worker and components of the vehicle 100 that are present on the conveying part 510. In the present embodiment, the conveyed object detector 526 includes a plurality of detectors, and the plurality of conveyed object detectors 526 is arranged with predetermined intervals from each other. Accordingly, it is possible to detect the presence or absence of the vehicle 100 in the conveyance section, that is, the position of the vehicle 100 in the conveyance section. The information regarding the position of the vehicle 100 detected by the conveyed object detectors 526 is also referred to as "conveyed object information". The detection results by the conveyed object detectors 526 are output to the conveyance controller 400. Note that the position of the vehicle 100 in the conveyance section may be acquired by using the vehicle detector 80. In this case, the conveyed object detectors 526 may be omitted.

Figure 3:
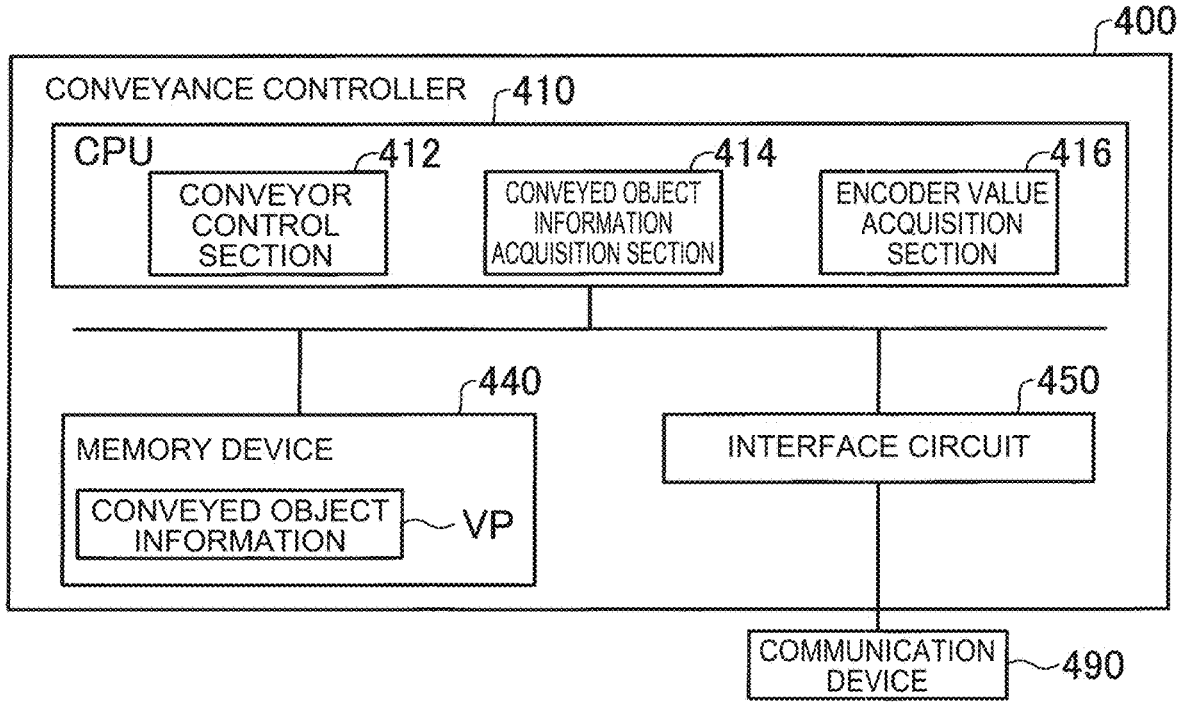
FIG. 3 is a block diagram showing a schematic configuration of a conveyance controller.

FIG. 3 is a block diagram showing the schematic configuration of the conveyance controller 400. The conveyance controller 400 includes a CPU 410 as a central processing unit, a memory device 440, an interface circuit 450, and a communication device 490. The CPU 410, the memory device 440, and the interface circuit 450 are connected to be bidirectionally communicable via an internal bus. The communication device 490 is connected to the interface circuit 450. The communication device 490 performs communication with the remote controller 300 and the vehicle 100 via the network, etc.

The memory device 440 is a RAM, a ROM, an HDD, an SSD, or the like, for example. The memory device 440 stores conveyed object information VP detected by the conveyed object detectors 526 in a readable/writable area of the memory device 440. The memory device 440 also stores programs to realize at least some of the functions provided in the present embodiment. By executing the respective programs, the CPU 410 functions as a conveyor control section 412, a conveyed object information acquisition section 414, and an encoder value acquisition section 416, respectively.

The conveyor control section 412 causes the motor 522 to be driven so as to perform on-off control on the conveying part 510 and perform control of the conveyance speed of the conveying part 510. In the case in which the vehicle 100 cannot be conveyed because some abnormality, such as overload of drive torque of the motor 522, has occurred in the conveyance apparatus 500, the conveyor control section 412 transmits a signal indicating occurrence of an abnormality to the remote controller 300.

The conveyed object information acquisition section 414 acquires a conveyance position of the vehicle 100 from the conveyed object detector 526, and stores the acquired conveyed position as the conveyed object information VP in the memory device 440. In the present embodiment, the conveyed object information VP includes information indicating by which conveyed object detector 526 the information has been acquired. When the conveyance position of the vehicle 100 is detected by the vehicle detector 80, as described above, the conveyed object information acquisition section 414 acquires the conveyance position of the vehicle 100 from the vehicle detector 80, and stores the acquired conveyance position as the conveyed object information VP in the memory device 440.

The encoder value acquisition section 416 acquires, from the encoder 524 disposed to the motor 522, an encoder value corresponding to the amount of driving of the motor 522, that is, the amount of driving of the conveying part 510 driven by the motor 522. In the present embodiment, the encoder 524 outputs an encoder value that is counted up according to the driving distance every time the conveying part 510 is driven by a preset distance. The encoder value is reset every time the conveying part 510 is driven by a preset distance according to each section where one vehicle 100 is mounted on the conveying part 510, more specifically, each section sectioned by two wheel stops 512, as described above. In other words, with reference to one end of the conveyance apparatus 500 from which the conveying part 510 is fed, the encoder value indicates a position of the wheel stop 512 located nearest this one end of the conveyance apparatus 500.

Figure 4:
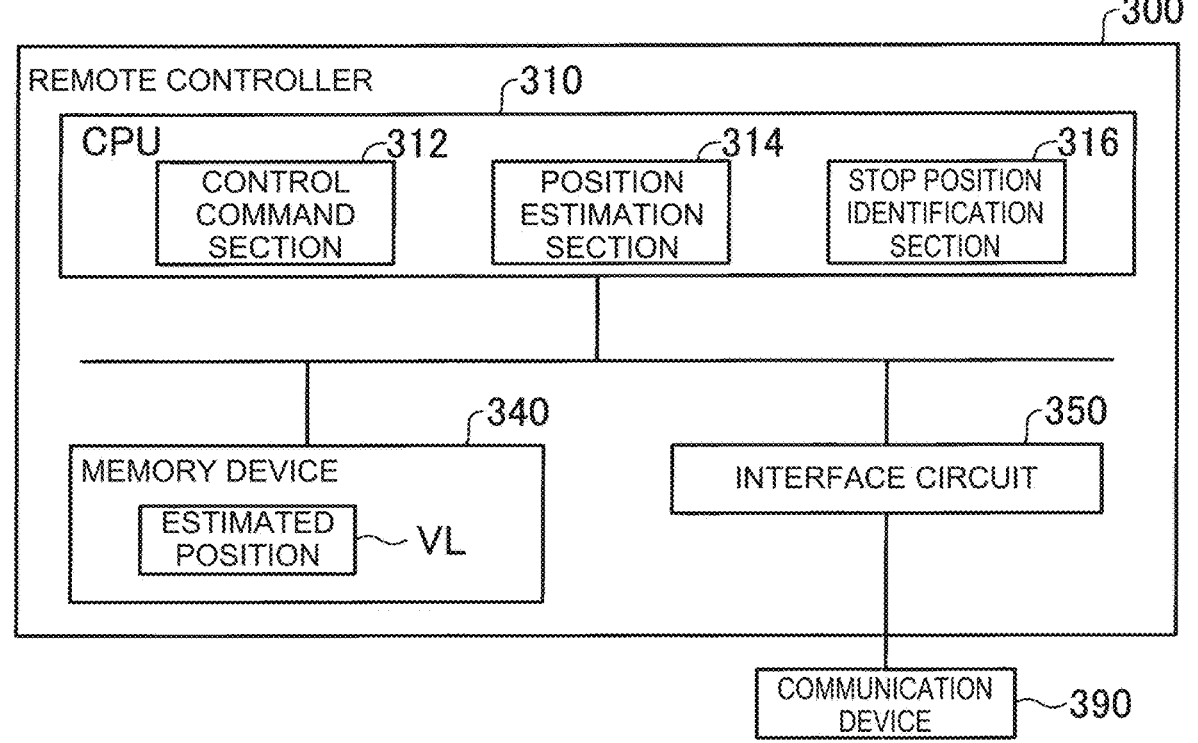
FIG. 4 is a block diagram showing a schematic configuration of a remote controller of the first embodiment.

FIG. 4 is a block diagram showing the internal functional configuration of the remote controller 300 according to the first embodiment. The remote controller 300 generates a control command to cause the vehicle 100 to perform automatic traveling by remote control, and transmits this command to the vehicle 100 so as to execute driving control on the vehicle 100 by remote control. The remote controller 300 controls the vehicle 100 to perform automatic traveling by the remote control, thereby performing conveyance of the vehicle 100 in the conveyance section of a factory.

The remote controller 300 includes a CPU 310 as a central processing unit, a memory device 340, an interface circuit 350, and a communication device 390. The CPU 310, the memory device 340, and the interface circuit 350 are connected via an internal bus to be bidirectionally communicable with each other. The communication device 390 is connected to the interface circuit 350. The communication device 390 communicates with the vehicle 100 and the conveyance controller 400 via the networks, etc.

The memory device 340 is a RAM, a ROM, an HDD, an SSD or the like, for example. The memory device 340 stores estimated positions VL described later in a readable/writable area of the memory device 340. The memory device 340 also stores computer programs for realizing at least some of the functions provided in the present embodiment. By executing the respective computer programs stored in the memory device 340, the CPU 310 functions as a control command section 312, a position estimation section 314, and a stop position identification section 316, respectively. Note that some or all of these functions may also be configured by hardware circuits.

The position estimation section 314 acquires vehicle information from the vehicle detector 80, and uses the acquired vehicle information for estimating the position and the orientation of the vehicle 100. In the present embodiment, the position estimation section 314 uses 3D point cloud data measured by the vehicle detector 80, as the vehicle information. The position estimation section 314 estimates the position and the orientation of the vehicle 100 in the acquired 3D point cloud data. Specifically, the position estimation section 314 executes, on the 3D point cloud data, template matching using vehicle point cloud data stored in the memory device 340 in advance. Hence, the position and the orientation of the vehicle 100 in the 3D point cloud data can be estimated with high accuracy. The estimated position and the orientation of the vehicle 100 are stored in the memory device 340 as the estimated position VL. For the vehicle point cloud data as a template, 3D CAD data of the vehicle 100 can be used, for example. The vehicle point cloud data includes information used for identifying the orientation of the vehicle 100. For the template matching using the vehicle point cloud data applied on the 3D point cloud data, for example, an iterative closest point (ICP) algorithm or a normal distribution transform (NDT) algorithm can be used. Note that the template matching may not be executed when the position of the vehicle 100 can be estimated from the 3D point cloud data with high accuracy, for example.

The control command section 312 functions as a command generating section that generates a control command to cause the vehicle 100 to execute various operations, and outputs this command to the vehicle 100. For example, the control command section 312 uses the estimated position and orientation of the vehicle 100, that is, the estimated position VL to generate a control command to cause the vehicle 100 to perform automatic traveling by the remote control, and transmits this command to the vehicle 100. This control command is, for example, a command to cause the vehicle 100 to travel according to a target route stored in the memory device 340. The control command can be generated as a command including driving force or braking force and a steering angle. When the vehicle 100 receives a request for the remote control, driving control is realized by the driving control section 212 of the ECU 200; and as a result, the vehicle 100 automatically travels. In the present embodiment, the control command section 312 can also generate a control command to drive the actuator group 140, such as not-shown lamps and alarms, which do not directly contribute to the driving control on the vehicle 100.

FIG. 5 is a flowchart showing the method of causing the vehicle 100 to travel of the first embodiment. In FIG. 5, a flow on the left shows the process executed in the remote controller 300, and a flow on the right shows the process executed in the vehicle 100. In step S110, using detection results of the vehicle detector 80, the control command section 312 acquires the position information indicating the position and the orientation of the vehicle 100. In the present embodiment, the position of the vehicle 100 includes X, Y, and Z coordinates in a global coordinate system of the factory. The position of the vehicle detector 80 is adjusted in advance. The control command section 312 detects the position of the vehicle 100 from the detection results acquired from the vehicle detector 80, and acquires the position information on the vehicle 100 in the factory from the detected position of the vehicle 100.

In step S120, the control command section 312 determines a target position toward which the vehicle 100 is to move. In the present embodiment, the target position is expressed in X, Y, and Z coordinates in the global coordinate system of the factory. A target route which is a route where the vehicle 100 is to travel is stored in advance in the memory device 340 of the remote controller 300. The target route is represented by a node indicating a starting point, a node indicating a passing point, a node indicating a destination, and links connecting the respective nodes. By using the position information and the target route of the vehicle 100, the control command section 312 determines a next target position toward which the vehicle 100 is to move. The control command section 312 determines the target position on the target route ahead of the current position of the vehicle 100.

In step S130, the control command section 312 generates a travel control signal to cause the vehicle 100 to travel toward the determined target position. In the present embodiment, the travel control signal includes acceleration and a steering angle of the vehicle 100 as parameters. The control command section 312 calculates a traveling speed of the vehicle 100 based on the shift in position of the vehicle 100, and compares the calculated traveling speed with a preset target speed of the vehicle 100. The control command section 312 determines the acceleration such that the vehicle 100 accelerates when the traveling speed is lower than the target speed, and determines the acceleration such that the vehicle 100 decelerates when the traveling speed is higher than the target speed. When the vehicle 100 is positioned on the target route, the control command section 312 determines the steering angle such that the vehicle 100 does not deviate from the target route. When the vehicle 100 is not positioned on the target route, that is, when the vehicle 100 deviates from the target route, the control command section 312 determines the steering angle such that the vehicle 100 returns to the target route.

In step S140, the control command section 312 transmits the generated travel control signal to the vehicle 100. The control command section 312 performs acquisition of the position of the vehicle 100, determination of the target position, generation of the travel control signal, and transmission of the travel control signal, repeatedly in a predetermined cycle.

The driving control section 212 of the vehicle 100 receives the travel control signal from the control command section 312 in step S150, and controls the actuator group 140 using the received travel control signal in step S160, thereby causing the vehicle 100 to travel at the acceleration and the steering angle represented in the travel control signal. The driving control section 212 repeatedly performs reception of the travel control signal and control on the actuator group 140 in a predetermined cycle. As described above, the vehicle 100 is brought to travel by the remote control, thereby causing the vehicle 100 to move without using conveying equipment, such as cranes and conveyors.

The stop position identification section 316 shown in FIG. 4 identifies the stop position at which the vehicle 100 is caused to stop in the conveying part 510. In the present embodiment, the stop position identification section 316 identifies the stop position by using the above-described encoder value and the conveyed object information VP. The method of identifying the stop position will be specifically described later. The encoder value is an example of the "control information indicating the control state of the conveyance apparatus 500" in the present disclosure. The conveyed object information VP is an example of the "obstacle information" in the present disclosure. The "control state of the conveyance apparatus 500" means various control states of the conveyance apparatus 500 regarding the conveyance of the vehicle 100 by the conveyance apparatus 500, such as a moving speed of the conveying part 510 and occurrence of an abnormality, for example.

With reference to FIG. 1, the conveyance method of the vehicle 100 of the present embodiment will be described.

FIG. 1 schematically shows the conveyance section of the vehicle 100 from a range AR1 to a range AR3. The range AR1 is a conveyance range where self-traveling conveyance of the vehicle 100 is performed by remote control. In the range AR1, the vehicle 100 automatically travels toward the conveyance apparatus 500 by remote control using the vehicle information acquired from the vehicle detector 80.

The range AR2 is an example of a conveyance start area where the conveyance of the vehicle 100 is started by the conveyance apparatus 500. In the range AR2, the remote control is stopped at the stop position, which is identified by the stop position identification section 316 described above, and the conveyance method of the vehicle 100 is switched from self-traveling conveyance by the remote control to conveyance by the conveyance apparatus 500. The vehicle 100 caused to travel by the remote control runs over a conveyance start position SP at which the conveyance of the vehicle 100 is started by the conveying part 510 and enters the range AR2. The conveyance start position SP is one end of the conveyance apparatus 500. The vehicle 100 having reached the range AR2 comes into a state in which the vehicle 100 can be conveyed by the conveying part 510.

In the range AR3, the vehicle 100 is conveyed by the conveyance apparatus 500 and is also subjected to processing of inspection and others. In the present embodiment, the range AR3 is an area outside the detection range of the vehicle 100 by the vehicle detector 80, and in the range AR3, no automatic traveling of the vehicle 100 is executed by the remote control. Note that the vehicle 100 in the range AR3 may be in a state of being wireless-communicable with the remote controller 300. For example, the remote control may be performed to execute operation other than traveling of the vehicle 100, such as powering on-off of the vehicle 100 and various components thereof. The range AR3 may also be set within the detection range by the vehicle detector 80. In this case, the automatic traveling by the remote control may also be executed in the range AR3.

After the processing of inspection and others are completed, the vehicle 100 is conveyed by the conveying part 510 to the other end (not shown) of the conveyance apparatus 500. At the other end of the conveyance apparatus 500, the vehicle 100 reaches a detectable range by another vehicle detector 80 (not shown), and is brought to automatically travel away from the conveying part 510 by the remote control.

Conveyance Method of the Vehicle 100

Figure 6:
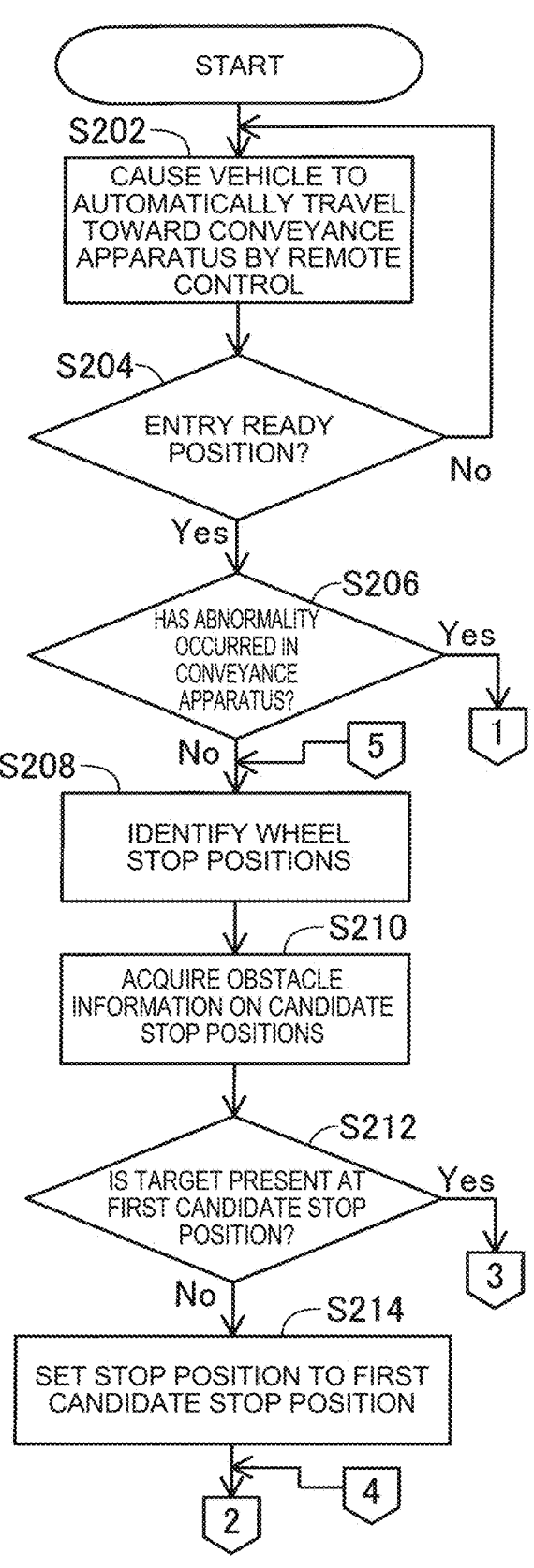
FIG. 6 is a flowchart showing a conveyance method of the vehicle of the first embodiment.
Figure 7:
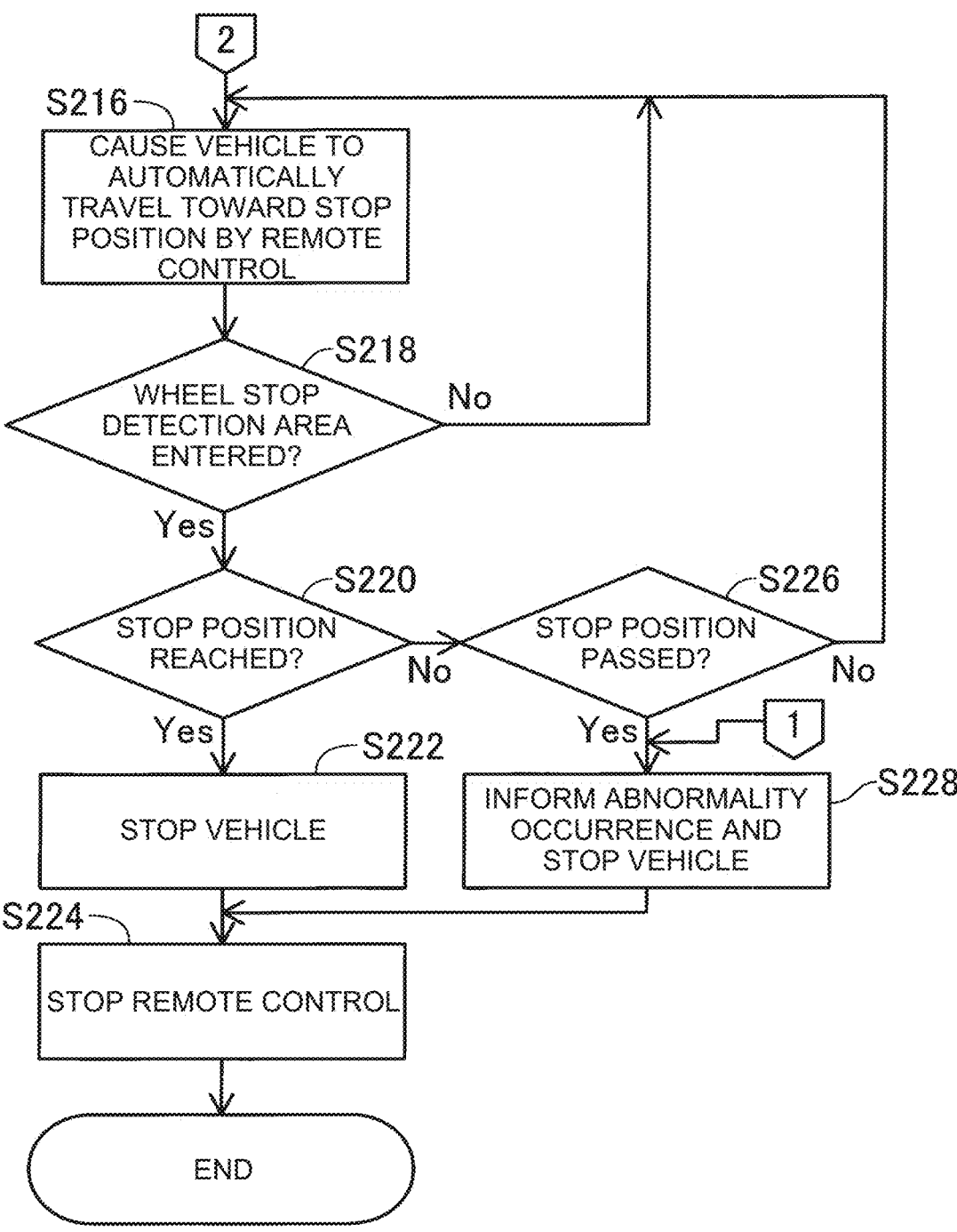
FIG. 7 is a flowchart showing the conveyance method of the vehicle of the first embodiment.
Figure 8:
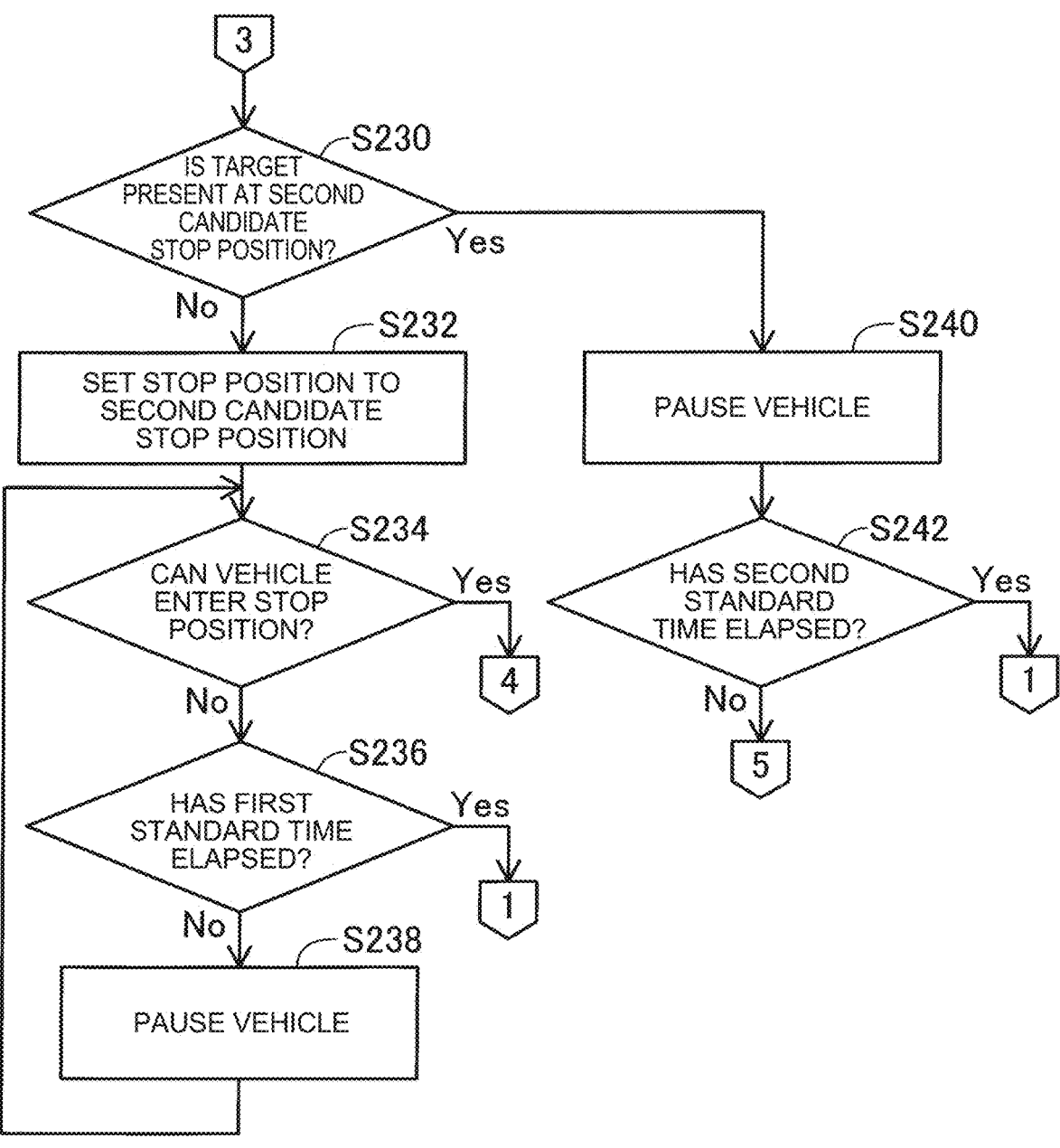
FIG. 8 is a flowchart showing the conveyance method of the vehicle of the first embodiment.

FIG. 6 to FIG. 8 show flowcharts of the conveyance method of the vehicle 100 of the first embodiment. This flow is started when traveling of the vehicle 100 toward the conveyance apparatus 500 is started.

In step S202 shown in FIG. 6, the control command section 312 causes the vehicle 100 to automatically travel toward the conveyance apparatus 500 by the remote control. More specifically, by using the position and the orientation of the vehicle 100 estimated by the position estimation section 314, the control command section 312 generates a control command to remotely control the vehicle 100 to move toward the conveyance apparatus 500, and transmits this control command to the vehicle 100.

In step S204, by using the position of the vehicle 100 estimated by the position estimation section 314, the control command section 312 determines whether or not the vehicle 100 has reached an entry ready position RP shown in FIG. 1. The "the entry ready position RP" is set in advance as a point located apart by a preset distance from the conveyance start position SP. The entry ready position RP is located before the conveyance start position SP when viewed from the vehicle 100 before reaching the conveyance start position SP. The distance between the conveyance start position SP and the entry ready position RP is set as a distance where the vehicle 100, automatically traveling at a preset speed, travels for time required for identifying a stop position described later. When determining that the vehicle 100 has not yet reached the entry ready position RP (step S204: No), the control command section 312 executes again the process of step S202 so as to continue the automatic traveling of the vehicle 100 by the remote control.

When determining that the vehicle 100 has reached the entry ready position RP (step S204: Yes), in step S206, the control command section 312 determines whether or not an abnormality has occurred in the conveyance apparatus 500. For example, when a signal indicating occurrence of an abnormality in the conveyance apparatus 500 is received from the conveyor control section 412, the control command section 312 determines that an abnormality has occurred in the conveyance apparatus 500. When determining that an abnormality has occurred in the conveyance apparatus 500 (step S206: Yes), the process of step S228 described later is executed.

When determining that no abnormality has occurred in the conveyance apparatus 500 (step S206: No), in step S208, the stop position identification section 316 identifies wheel stop positions. In the present embodiment, the stop position identification section 316 acquires an encoder value from the encoder value acquisition section 416, and identifies the position of a wheel stop 512a located closest to the conveyance start position SP based on the value indicated by the encoder value. Furthermore, by repeatedly adding a distance between two wheel stops 512, which is set in advance, to the position of the identified wheel stop 512a, the stop position identification section 316 identifies positions of the other wheel stops 512 including a wheel stop 512b and a wheel stop 512c.

In step S210, using the identified positions of the wheel stops 512, the stop position identification section 316 identifies candidates of the above-described stop position (hereinafter also referred to as "candidate stop positions"), and acquires obstacle information on the candidate stop positions. In the present embodiment, as shown in FIG. 1, the stop position identification section 316 identifies, among the identified wheel stops 512, the position of the wheel stop 512a located closest in distance to the conveyance start position SP as a second candidate stop position ST2, and identifies the position of the wheel stop 512b located second closest in distance to the conveyance start position SP as a first candidate stop position ST1. The candidate stop positions do not have to coincide with the positions of the wheel stop 512a and the wheel stop 512b, respectively, and may be identified as positions that correspond to the respective wheel stop positions and are located apart by a predetermined distance from the corresponding wheel stops. The first candidate stop position ST1 is located ahead of the second candidate stop position ST2 when viewed from the conveyance start position SP. Corresponding positions of up to how many consecutive wheel stops 512, counting from a wheel stop 512 closest to the conveyance start position SP, should be identified as the candidate stop positions may be determined as appropriate, by considering to which area on the conveying part 510 the vehicle 100 can automatically travel by the remote control, more specifically, based on the detection range by the vehicle detector 80, or the like. As the obstacle information, of the conveyed object information VP detected by the conveyed object detectors 526, the stop position identification section 316 acquires conveyed object information VP acquired by a conveyed object detector 526a disposed at a position corresponding to the first candidate stop position ST1 and conveyed object information VP acquired by a conveyed object detector 526b disposed at a position corresponding to the second candidate stop position ST2.

In step S212, the stop position identification section 316 determines whether or not a target is present at the first candidate stop position ST1. More specifically, the stop position identification section 316 determines whether or not a target is present within an area in a preset size with reference to the first candidate stop position ST1. The stop position identification section 316 determines that a target is present when the vehicle 100 stops at the first candidate stop position ST1 and also when a component or components of the vehicle 100 are placed in this area. This is because a component or components of the vehicle 100 hinder the vehicle 100 from being stopped. Note that when a worker is present at the first candidate stop position ST1, the stop position identification section 316 may determine that no target is present. This is because, when the target is a worker, the worker is expected to pass this position in a short time and thus does not hinder the vehicle 100 from being stopped.

When determining that no target is present at the first candidate stop position ST1 (step S212: No), in step S214, the stop position identification section 316 sets the stop position to the first candidate stop position ST1. The case in which it is determined that a target is present at the first candidate stop position ST1 (step S212: Yes) will be described later.

In step S216 shown in FIG. 7, the control command section 312 causes the vehicle 100 to automatically travel toward the stop position by the remote control.

In step S218, the control command section 312 determines whether or not the vehicle 100 has entered a wheel stop detection area ARd. As shown in FIG. 1, the "wheel stop detection area ARd" means an area preset with reference to the position of the wheel stop 512 identified as the stop position. When determining that the vehicle 100 has not yet entered the wheel stop detection area ARd (step S218: No), the control command section 312 continues the automatic traveling of the vehicle 100 by the remote control.

When determining that the vehicle 100 has entered the wheel stop detection area ARd (step S218: Yes), in step S220, the control command section 312 determines whether or not the vehicle 100 has reached the stop position. In the present embodiment, the control command section 312 determines that the vehicle 100 has reached the stop position when the acceleration sensor 182 detects impact caused by the wheels 166 of the vehicle 100 at the time of contacting the wheel stop 512. By setting the wheel stop detection area ARd, it is possible to prepare for performing impact detection by the acceleration sensor 182 in advance; therefore, it is possible to improve accuracy in position of the stop position when the wheel stop 512 is detected. When the accuracy in position at the stop position is not required, the wheel stop detection area ARd may not be set, and the above process of step S218 may not be executed.

When determining that the vehicle 100 has reached the stop position (step S220: Yes), the control command section 312 stops the vehicle 100 in step S222. At this time, it is preferable to further generate a control command to command switching of the transmission part 162 provided in the vehicle 100 to the P range, and transmit this control command to the vehicle 100, by the control command section

15

312. By switching to the P range, it is possible to prevent the vehicle 100 on the conveying part 510 from moving during conveyance of the vehicle 100 by the conveyance apparatus 500. As the traveling of the vehicle 100 is stopped, the remote controller 300 can allow a worker to carry out a smooth inspection on the electrical system, the engine compartment, etc. of the vehicle 100 during the conveyance of the vehicle 100, for example.

In step S224, the control command section 312 stops the remote control on the vehicle 100. The vehicle 100 while the remote control is stopped is conveyed by the conveyance apparatus 500 and is subjected to predetermined processing of inspection, assembly, painting, and the like. In the present embodiment, the stopping of the remote control on the vehicle 100 is achieved by stopping generation of the control command by the remote controller 300 or stopping transmission of the control command to the vehicle 100. By stopping the remote control on the vehicle 100 during the conveyance by the conveyance apparatus 500, the remote controller 300 can reduce increase in electric power consumption and in processing load on itself and other devices related to the remote control on the vehicle 100. The vehicle 100 may be maintained wireless-communicable with the remote controller 300 even after the remote control is stopped. For example, the remote control may be performed so as to execute operation other than traveling of the vehicle 100, such as powering on-off of the vehicle 100 and various components thereof. The remote controller 300 then completes the processing.

When determining that the vehicle 100 has not yet reached the stop position (step S220: No), in step S226, the control command section 312 determines whether or not the vehicle 100 has passed the stop position. When determining that the vehicle 100 has not yet passed the stop position (step S226: No), the process of step S216 is executed again.

When determining that the vehicle 100 has passed the stop position (step S226: Yes), in step S228, the control command section 312 causes the vehicle 100 to report occurrence of an abnormality by the remote control, and also stops the vehicle 100. For example, when an abnormality occurs in the contact detection with the wheel stop 512 by the acceleration sensor 182 or in the position estimation of the vehicle 100 by the position estimation section 314, there is a risk that the vehicle 100 might pass the stop position. When such an abnormality occurs, for example, the control command section 312 generates a control command to drive not-shown lamps and alarms of the vehicle 100, and transmits this control command to the vehicle 100, thereby informing a worker who executes the operation on the vehicle 100, a manager of the concerned process, or an administrator of the conveyance system 600 of the abnormality occurrence. Since the worker and others are informed of the abnormality occurrence, it is possible to encourage them to resolve the abnormality and reduce increase in waiting time for the conveyance of the vehicle 100 due to the abnormality occurrence, thereby reducing increase in time required for the conveyance of the vehicle 100. After step S228, the process of step S224 described above is executed.

Returning to the description of the determination in step S212 shown in FIG. 6, the case in which it is determined that a target is present at the first candidate stop position ST1 (step S212: Yes) will be described. In step S230 shown in FIG. 8, the stop position identification section 316 determines whether or not a target is present at the second candidate stop position ST2. The determination in this step is realized by the same manner as in step S212 above.

When determining that no target is present at the second candidate stop position ST2 (step S230: No), in step S232, the stop position identification section 316 sets the stop position at the second candidate stop position ST2. The case in which it is determined that a target is present at the second candidate stop position ST2 (step S230: Yes) will be described later.

In step S234, the control command section 312 determines whether or not the vehicle 100 can enter the stop position. In the present embodiment, the control command section 312 determines that the vehicle 100 can enter the stop position when the distance between the second candidate stop position ST2 set as the stop position and the conveyance start position SP is longer than the total length of the vehicle 100. The "total length of the vehicle 100" is an example of a "preset threshold value" in the present disclosure. When it is determined that the vehicle 100 can enter the stop position (step S234: Yes), the above process of step S216 is executed.

When determining that the vehicle 100 cannot enter the stop position (step S234: No), in other words, when the distance between the stop position and the conveyance start position SP is equal to or less than the total length of the vehicle 100, in step S236, the control command section 312 determines whether or not a first standard time has elapsed since the determination in step S234 was first executed after the start of this flow. The "first standard time" is set as time required until the vehicle 100 becomes able to enter the stop position. The first standard time is set as time required until the distance between the stop position and the conveyance start position SP becomes longer than the total length of the vehicle 100, based on the positions of the wheel stops 512 which are identified in step S208, for example. The first standard time may be set in advance as time required for the conveying part 510 to move by a distance between two wheel stops 512 adjacent to each other.

When determining that the first standard time has not yet elapsed (step S236: No), in step S238, the control command section 312 pauses the vehicle 100 and executes the above process of step S234 again. In other words, the control command section 312 repeats the processes of step S234 to step S238 until the vehicle 100 becomes able to enter the stop position or until the first standard time elapses. In this manner, in the present embodiment, when the distance between the stop position and the conveyance start position SP is equal to or less than the total length of the vehicle 100, the control command section 312 controls the timing of entry of the vehicle 100 into the conveying part 510 by pausing the vehicle 100. Accordingly, it is possible to prevent the vehicle 100 from being mounted on and conveyed by the conveying part 510 in a state in which the vehicle 100 overhangs from the conveying part 510, thereby reducing wear of the wheels 166.

When determining that the first standard time has elapsed (step S236: Yes), the control command section 312 executes the above process of step S228. This is because, when the vehicle 100 is not yet ready for entering the stop position after the first standard time has elapsed, it can be considered that some abnormality, such as an emergency stop of the conveyance apparatus 500, has occurred.

Returning to the description of the determination in step S230, the case of determining that a target is present at the second candidate stop position ST2 (step S230: Yes) will be described. The control command section 312 pauses the vehicle 100 in step S240, and determines whether or not a second standard time has elapsed after the start of the pause in step S242. The "second standard time" is set as time required until a new wheel stop 512 appears by driving the conveying part 510 and the vehicle 100 becomes ready for entry. For example, based on the positions of the wheel stops 512 identified in step S208, the second standard time is set as time required until the distance between another wheel stop 512, which appears subsequent to the wheel stop 512 located closest to the conveyance start position SP, and the conveyance start position SP becomes longer than the total length of the vehicle 100. Alternatively, as with the first standard time, the second standard time may be preset as time required for the conveying part 510 to move by a distance between two wheel stops 512 adjacent to each other.

When it is determined that the second standard time has not yet elapsed (step S242: No), the above process of step S208 is executed again. When determining that a target is present at the second candidate stop position ST2, it can be considered that the vehicle 100 is stopped at the wheel stop 512 located closest to the conveyance start position SP. Hence, the control command section 312 pauses the vehicle 100 until another new wheel stop 512 appears by driving the conveying part 510 and the vehicle 100 becomes ready for entry.

When determining that the second standard time has elapsed (step S242: Yes), the above process of step S228 is executed. This is because, when the vehicle 100 is not yet ready for entering the stop position after the second standard time has elapsed, it can be considered that an abnormality has occurred, such as an emergency stop of the conveyance apparatus 500.

According to the above-described conveyance system 600 of the first embodiment, this conveyance system identifies the stop position of a mobile object on the conveying part 510, and generates and outputs a control command to cause the vehicle 100 to enter the conveying part 510 according to the stop position. Accordingly, even in the case in which the stop position is changed after the vehicle 100 has entered the conveyance apparatus 500, due to the processing state of delay or progress of another vehicle ahead, or interruption of another vehicle that is conveyed by the worker's driving, it is possible to appropriately cause the vehicle 100 to enter the conveying part 510.

At least one of the control information indicating the control state of the conveyance apparatus 500 and the obstacle information indicating presence or absence of an obstacle on the conveying part 510 is used to identify the stop position; therefore, it is possible to appropriately identify the stop position according to the conveyance state of the conveyance apparatus 500, which is indicated by at least one of the control information and the obstacle information.

The control information is used to identify a plurality of candidate stop positions, and the obstacle information is used to identify the stop position among the plurality of candidate stop positions; therefore, compared to the configuration to identify the stop position using only one of the control information and the obstacle information, it is possible to more appropriately identify the stop position.

When no obstacle is present at any one of the candidate stop positions, among the plurality of candidate stop positions, a candidate stop position located farthest from the conveyance start position SP is identified as the stop position; and when an obstacle is present at any one of the candidate stop positions, among the plurality of candidate stop positions, the candidate stop position, immediately before the candidate stop position at which the obstacle located closest to the conveyance start position SP is present as viewed from the conveyance start position SP, is identified as the stop position. Accordingly, it is possible to prevent the distance between the obstacle on the conveying part 510 and the stop position from increasing more than necessary, thereby reducing deterioration of conveyance efficiency of the vehicle 100 by the conveyance apparatus 500.

When the distance between the stop position and the conveyance start position SP is larger than a preset threshold value, the control command to cause the vehicle 100 to enter the conveying part 510 is generated and output; therefore, it is possible to cause the vehicle 100 to enter the conveying part 510 at a timing of securing a sufficient space for mounting the vehicle 100 on the conveying part 510. On the other hand, when the distance between the stop position and the conveyance start position SP is equal to or less than the preset threshold, the control command to pause the vehicle 100 for a preset time is generated and output; therefore, it is possible to cause the vehicle 100 to wait until a sufficient space for mounting the vehicle 100 on the conveying part 510 is secured. Accordingly, it is possible to prevent the vehicle 100 from entering the conveying part 510 without securing a sufficient space for mounting the vehicle 100 on the conveying part 510 and from being mounted and conveyed on the conveying part 510 while the vehicle 100 overhangs from the conveying part 510, thereby preventing the vehicle 100 from being damaged.

Second Embodiment

Figure 9:
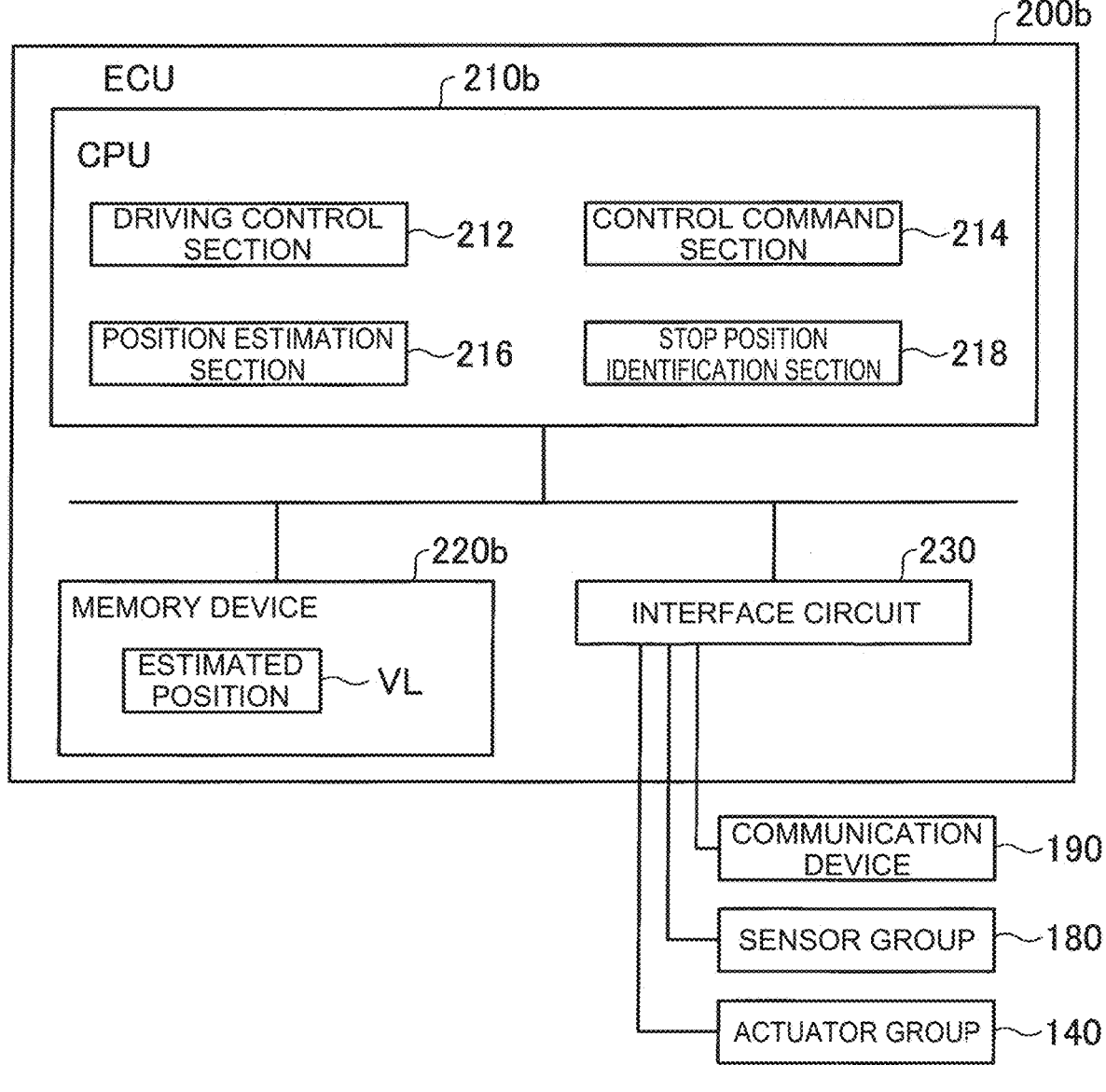
FIG. 9 is a block diagram showing a schematic configuration of an ECU included in the vehicle of the second embodiment.

FIG. 9 is a block diagram showing the schematic configuration of an ECU 200*b* installed in the vehicle 100 of the second embodiment. The present embodiment is different from the first embodiment in that the conveyance system 600 includes no remote controller 300. Specifically, the present embodiment is different from the first embodiment in that, instead of the remote controller 300, the ECU 200*b* installed in the vehicle 100 functions as a controller. The other configurations of the conveyance system 600 are the same as those of the first embodiment unless otherwise explained.

As shown in FIG. 9, the ECU 200*b* is different from the ECU 200 described in the first embodiment in that the ECU 200*b* includes a CPU 210*b* in place of the CPU 210, and a memory device 220*b* in place of the memory device 220. Specifically, the memory device 220*b* stores programs to realize not only the functions of the CPU 210 described in the first embodiment but also the functions corresponding to the control command section 312, the position estimation section 314, and the stop position identification section 316, which are included in the remote controller 300. As a result, the CPU 210*b* further functions as a control command section 214, a position estimation section 216, and a stop position identification section 218, corresponding to the above functions. The memory device 220*b* also stores the estimated positions VL, which are stored in the remote controller 300. According to the vehicle 100 thus configured, the same effects as those of the first embodiment can be obtained without using a device separated from the device of the vehicle 100, such as the remote controller 300.

Figure 10:
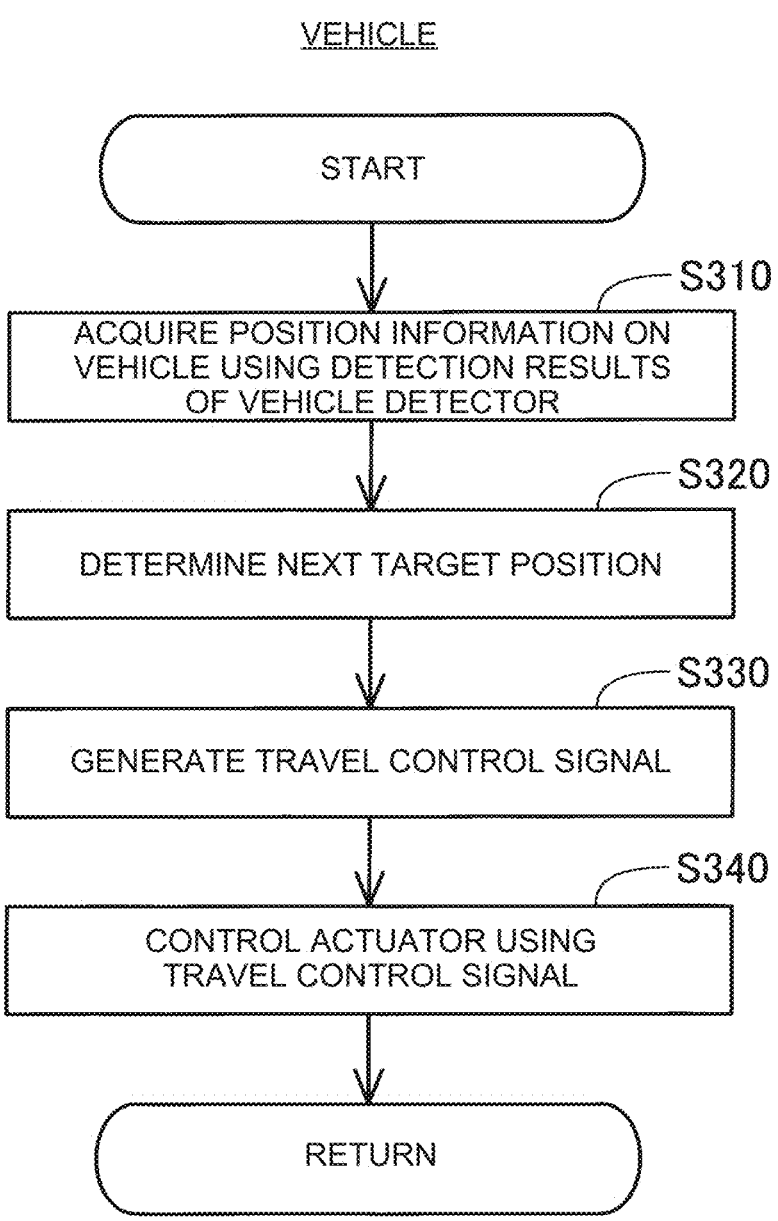
FIG. 10 is flowchart showing a method of causing the vehicle to travel of the second embodiment.

FIG. 10 is a flowchart showing the method of causing the vehicle 100 of the present embodiment to travel. In step S310, the position estimation section 216 acquires the position and the orientation of the vehicle 100 by using detection results of the vehicle detector 80. In step S320, the control command section 214 determines a next target position toward which the vehicle 100 is to travel. In the present embodiment, an ideal route is stored in advance in the memory device 220b of the ECU 200b. In step S330, the control command section 214 generates a travel control signal to cause the vehicle 100 to travel toward the determined target position. In step S340, the driving control section 212 controls the actuator group 140 by using the generated travel control signal so as to cause the vehicle 100 to travel at acceleration and a steering angle represented in the travel control signal. The driving control section 212 repeats acquisition of the position and the orientation of the vehicle 100, determination of the target position, generation of the travel control signal, and control on the actuator group 140 in a predetermined cycle. According to the vehicle 100 of the present embodiment, it is possible to cause the vehicle 100 to travel by autonomous control, without using the remote control on the vehicle 100 by the remote controller 300.

Other Embodiments

In the above embodiment, the stop position identification section 316 identifies the plurality of candidate stop positions by using the positions of the plurality of wheel stops 512 that are identified by using encoder values as the control information on the conveyance apparatus 500, and identifies the stop position among the plurality of candidate stop positions by using the obstacle information; however, the present disclosure is not limited to this. For example, among the plurality of wheel stops 512 that are identified by using the encoder values as the control information on the conveyance apparatus 500, the stop position identification section 316 first identifies the position of the wheel stop 512 at which another vehicle is stopped. The stop position identification section 316 may be configured to identify, among the wheel stops 512 at which other vehicles 100 are stopped, the position of the wheel stop 512c at which another vehicle 102 shown in FIG. 1 is stopped, the wheel stop 512c located closest to the conveyance start position SP, and then identify the wheel stop 512b located immediately before the identified wheel stop 512c as the stop position, as viewed from the conveyance start position SP. This aspect also exerts the same effects as those of the above-described embodiment. The stop position of the vehicle 100 may be preset and stored in the memory device 340; and in this aspect, the stop position identification section 316 may identify the stop position of the vehicle 100 with reference to the stop position stored in the memory device 340. With this aspect, it is possible to cause the vehicle 100 to enter the conveying part 510 according to the preset stop position.

The stop position identification section 316 may identify the stop position by using at least one of the control information on the conveyance apparatus 500 and the obstacle information. For example, the stop position identification section 316 may use the obstacle information for identifying the position of another vehicle 102, which is an obstacle present before the vehicle 100 as shown in FIG. 1, and may identify, as the stop position, a position located apart by a preset distance from the position of the identified vehicle 102. According to this aspect, the stop position can be identified in a simpler way without using the control information on the conveyance apparatus 500.

Instead of using the obstacle information, the stop position identification section 316 may use the control information on another vehicle 102 and the encoder value as the control information on the conveyance apparatus 500 and identify the position of the wheel stop 512c where the vehicle 102 is stopped. More specifically, the stop position identification section 316 first uses, as the control information on another vehicle 102, the information indicating whether or not the vehicle 102 is stopped and the estimated position VL estimated as the position of the vehicle 102 so as to identify the position of the wheel stop 512c located closest to the vehicle 102 that is stopped. The stop position identification section 316 may identify, as the stop position, the wheel stop 512b located immediately before the wheel stop 512c as viewed from the conveyance start position SP. According to this aspect, the stop position can be identified in a simpler way without using the obstacle information.

In the above embodiment, when the distance between the stop position and the conveyance start position SP is equal to or less than the total length of the vehicle 100, the control command section 312 controls the vehicle 100 to pause so as to control the timing of entry of the vehicle 100 into the conveying part 510; however, the present disclosure is not limited to this. For example, the control command section 312 may control the speed of the vehicle 100 from entry into the conveyance apparatus 500 until stopping at the stop position. In this case, without stopping the vehicle 100, the control command section 312 may decrease the conveyance speed of the vehicle 100 by self-driving. With this aspect, it is also possible to control the timing of causing the vehicle 100 to enter the conveying part 510 by delaying the timing of arrival of the vehicle 100 at the conveyance start position SP.

In each of the above embodiments, the cases of including the position estimation section 314 and the position estimation section 216 have been exemplified. On the other hand, for example, the position estimation section 314 and the position estimation section 216 may be omitted when highly accurate position information is not required in the automatic traveling of the vehicle 100. In this case, for example, detection results of a sensor capable of detecting the vehicle 100, such as the conveyed object detector 526 provided in the conveyance apparatus 500, may be used.

In the above embodiment, as the obstacle information, the stop position identification section 316 acquires, of the conveyed object information VP detected by the conveyed object detectors 526, conveyed object information VP acquired by the conveyed object detector 526a disposed at a position corresponding to the first candidate stop position ST1, and conveyed object information VP acquired by the conveyed object detector 526b disposed at a position corresponding to the second candidate stop position ST2; however, the present disclosure is not limited to this. As the obstacle information, instead of acquiring the conveyed object information VP, the stop position identification section 316 may acquire the vehicle information acquired by the vehicle detector 80. Also with this aspect, for example, with reference to areas corresponding to the first candidate stop position ST1 and the second candidate stop position ST2 in the 3D point cloud data acquired as the vehicle information, the stop position identification section 316 can determine whether or not obstacles such as vehicles are present at the first candidate stop position ST1 and the second candidate stop position ST2.

In the above embodiment, the case in which the vehicle detector 80 is LiDAR has been exemplified. On the other hand, as the vehicle detector 80, an external camera disposed at a different position from the vehicle 100 may be used instead of or together with LiDAR. In this case, the vehicle detector 80 acquires images of the vehicle 100 as the vehicle information. The position estimation section 314 can estimate the position of the vehicle 100 and the orientation of the vehicle 100 by using the captured images acquired by the external camera. The position of the vehicle 100 can be acquired, for example, by using an outline of the vehicle 100 detected from the captured images, calculating coordinates of measurement points of the vehicle 100 in the image coordinate system, and converting the calculated coordinates into coordinates in a global coordinate system. The orientation of the vehicle 100 can be estimated, for example, by using the optical flow method, based on the orientation of a movement vector of the vehicle 100 calculated from the change in position of feature points of the vehicle 100 between frames of the captured images. The orientation of the vehicle 100 may be calculated by using output results of a yaw-rate sensor or the like provided in the vehicle 100, for example.

The outline of the vehicle 100 included in the captured images can be detected, for example, by inputting the captured image into a detection model that utilizes artificial intelligence. An example of the detection model may include a learned machine learning model that has already been trained to realize either semantic segmentation or instance segmentation, for example. As this machine learning model, for example, a convolutional neural network (hereinafter, referred to as a CNN) trained by supervised learning using a training dataset may be used. The training dataset has a plurality of training images including the vehicle 100, and correct answer labels indicating whether regions in each training image are regions showing the vehicle 100 or regions showing other than the vehicle 100, for example. At the time of learning using the CNN, it is preferable to update parameters of the CNN so as to reduce errors between output results from the detection model and correct answer labels by a back-propagation (an error back propagation method).

In each of the above embodiments, the vehicle 100 has been exemplified as a passenger vehicle, a truck, a bus, or a construction vehicle. However, the vehicle 100 is not limited to these vehicles and may be various types of mobile objects. A "mobile object" means an object that is movable, and may be a vehicle or an electric vertical takeoff and landing aircraft (so-called a "flying automobile"), for example. The vehicle may be a vehicle that travels on one or more wheels or on an infinite track, for example, and may be a two-wheeled vehicle, a four-wheeled vehicle, a tank, etc. The vehicle includes battery electric vehicles (BEV), gasoline automobiles, hybrid electric vehicles, and fuel cell electric vehicles. In the case in which the mobile object is other than a vehicle, an expression of a "vehicle" or an "automobile" in the present disclosure may be replaced with a "mobile object" as appropriate, and an expression of "traveling" may be replaced with "moving" as appropriate.

It is sufficient for the vehicle 100 to have at least a configuration to be movable by remote control. For example, the vehicle 100 may have an aspect of a platform including the following configurations. Specifically, the vehicle 100 may have at least a configuration to exert functions of "traveling," "turning," and "stopping" by remote control. In other words, the "vehicle 100 that is movable by remote control" may not include at least some of interior components, such as a driver's seat and a dashboard, and may not include at least some of exterior components, such as bumpers and fenders, or may not include a bodyshell. In this case, remaining components such as a bodyshell may be mounted to the vehicle 100 before the vehicle 100 is shipped from the factory, or the vehicle 100 may be shipped from the factory while no remaining components such as a bodyshell are mounted to the vehicle 100, and thereafter remaining components such as a bodyshell may be mounted to the vehicle 100. Each component may be mounted from any direction, such as the upper, lower, front, rear, right or left side of the vehicle 100, and may be mounted from the same direction or from different directions. As for the aspect of the platform, the position determination can be made in the same manner as that in the vehicle 100 of the first embodiment.

The vehicle 100 may be manufactured by any manufacturing method. For example, the vehicle 100 may be manufactured by combining a plurality of modules. A module means a unit composed of a plurality of components that are grouped together according to parts or functions of the vehicle 100. For example, the platform of the vehicle 100 may be manufactured by combining a front module configuring a front part of the platform, a center module configuring a center part of the platform, and a rear module configuring a rear part of the platform. The number of modules configuring the platform is not limited to three, and may also be two or less, or four or more. In addition to or instead of the components configuring the platform, components configuring a different part from the platform of the vehicle 100 may be modularized. The various modules may include any exterior components such as bumpers and grilles, and any interior components such as seats and consoles. Not limited to the vehicle 100 but a mobile object in any form may be manufactured by combining a plurality of modules. Such modules may be each manufactured, for example, by joining a plurality of components by welding, with fixtures, or the like, or by integrally molding at least some of components composing each module as a single component by casting. A molding method of integrally molding a single component, especially a relatively large component is referred to as giga-casting or mega-casting. For example, the front module, the center module, and the rear module described above may be manufactured by using giga-casting.

Some or all of the functions of the conveyor control section 412 and the conveyed object information acquisition section 414, which are realized by the conveyance controller 400 shown in each of the above embodiments, may also be realized by the remote controller 300. In other words, the conveyance system 600 may include the remote controller 300 alone.

In the above first embodiment, it has been exemplified that the remote controller 300 executes the processing from the acquisition of the position and the orientation of the vehicle 100 to the generation of the travel control signal. On the other hand, the vehicle 100 may execute at least part of the processing from the acquisition of the position and the orientation of the vehicle 100 to the generation of the travel control signal. For example, the following aspects (1) to (3) may be adopted.

(1) The remote controller 300 may acquire the position and the orientation of the vehicle 100, determine a next target position toward which the vehicle 100 is to move, and generate the route from the current position of the vehicle 100 indicated in the acquired position to the target position. The remote controller 300 may generate a route to a target position located between the current position and the destination or a route to the destination. The remote controller 300 may transmit the generated route to the vehicle 100. The vehicle 100 may generate a travel control signal such that the vehicle 100 travels on the route received from the remote controller 300, and control the actuator group 140 by using the generated travel control signal.

(2) The remote controller 300 may acquire the position and the orientation of the vehicle 100, and transmit the acquired position and orientation to the vehicle 100. The vehicle 100 may determine the next target position toward which the vehicle 100 is to move, generate the route from the current position of the vehicle 100 indicated in the received position to the target position, generate the travel control signal such that the vehicle 100 travels on the generated route, and control the actuator group 140 by using the generated travel control signal.

(3) In the above aspects (1) and (2), the vehicle 100 is provided with an internal sensor, and detection results output from the internal sensor may be used in at least one of the generation of the route and the generation of the travel control signal. An example of the internal sensor may include, for example, a camera, LiDAR, a millimeter wave radar, an ultrasonic sensor, a GPS sensor, an acceleration sensor, a gyro sensor, etc. For example, in the above aspect (1), the remote controller 300 may acquire detection results of the internal sensor and reflect the detection results of the internal sensors in the route when generating the route. In the above aspect (1), the vehicle 100 may acquire detection results of the internal sensor and reflect the detection results of the internal sensor in the travel control signal when generating the travel control signal. In the above aspect (2), the vehicle 100 may acquire detection results of the internal sensor and reflect the detection results of the internal sensor in the route when generating the route. In the aspect (2) above, the vehicle 100 may acquire detection results of the internal sensor and reflect the detection results of the internal sensor in the travel control signal when generating the travel control signal.

In the above second embodiment, the vehicle 100 is provided with an internal sensor, and detection results output from the internal sensor may be used in at least one of the generation of the route and the generation of the travel control signal. For example, the vehicle 100 may acquire the detection results of the internal sensor and reflect the detection results of the internal sensor in the route when generating the route. The vehicle 100 may acquire the detection results of the internal sensor and reflect the detection results of the internal sensor in the travel control signal when generating the travel control signal.

In the above second embodiment, the vehicle 100 acquires the position and the orientation of the vehicle 100 by using the detection results of the vehicle detector 80. On the other hand, it may also be configured that the vehicle 100 is provided with an internal sensor, the vehicle 100 acquires the position and the orientation by using the detection results of the internal sensor, determines the next target position toward which the vehicle 100 is to move, generates the route from the current position of the vehicle 100 indicated in the acquired position and orientation to the target position, generates the travel control signal to travel on the generated route, and uses the generated travel control signal to control the actuator group 140. In this case, the vehicle 100 can travel without using any detection results of the vehicle detector 80. The vehicle 100 may acquire a target arrival time and traffic jam information from the outside of the vehicle 100 and reflect the target arrival time and the traffic jam information in at least one of the route and the travel control signal. In addition, the vehicle 100 may be provided with all of the configurations of the conveyance system 600 and or all of the functional configurations of the remote controller 300. That is, the processing, which is realized by the conveyance system 600 and or by the remote controller 300 such as the processing of identifying the candidate stop positions shown in the present disclosure, may also be realized by the vehicle 100 alone.

In the above first embodiment, the remote controller 300 automatically generates the travel control signal to be transmitted to the vehicle 100. On the other hand, the remote controller 300 may generate the travel control signal to be transmitted to the vehicle 100 according to operation of an operator located outside the vehicle 100. For example, the operator may operate a control device including: a display displaying an image output from the vehicle detector 80; a steering wheel, an accelerator pedal, and a brake pedal for remote control on the vehicle 100; and a communication device for communicating with the remote controller 300 via wired or wireless communication, and the remote controller 300 may generate a travel control signal according to the operation applied to the control device.

Conveying the vehicle using vehicle traveling by unmanned driving is also referred to as "self-traveling conveyance". The configuration for realizing the self-traveling conveyance is also referred to as a "vehicle remote-control self-traveling conveyance system". A production system to produce vehicles using self-traveling conveyance is also referred to as "self-driving production". In the self-driving production, for example, at least part of the vehicle conveyance is realized by the self-traveling conveyance in a factory where vehicles are manufactured.

In the above embodiments, at least one of the control command section 312 and the conveyor control section 412 may perform, in addition to the above control, at least one of the control to stop traveling of the vehicle 100 and the control to stop driving of the conveying part 510 depending on the state of the vehicle 100 on the conveying part 510. The conveyor control section 412 is an example of a "conveyance control section" in the present disclosure. In the processes shown in FIG. 6 to FIG. 8 described above, when the stop position identification section 316 cannot identify the stop position of the vehicle 100 on the conveying part 510, the control command section 312 may stop the vehicle 100.

When the traveling of the vehicle 100 is stopped while the vehicle 100 does not completely enter the conveying part 510, that is, only the front wheels of the vehicle 100 are positioned on the conveying part 510 but the rear wheels of the vehicle 100 are not positioned on the conveying part 510, the conveyor control section 412 may stop the driving of the conveying part 510.

When the vehicle 100 that is traveling on the conveying part 510 experiences wheel breakaway, the control command section 312 may stop the traveling of the vehicle 100 and the conveyor control section 412 may stop the driving of the conveying part 510. Note that the "wheel breakaway" means a situation in which the wheel or wheels 166 of the vehicle 100 overhang from the conveying part 510.

When the vehicle 100 is stopped in an emergency, the conveyor control section 412 may stop the driving of the conveying part 510.

The present disclosure is not limited to the above-described embodiments, and can be realized in various configurations without departing from the gist thereof. For example, the technical features in the embodiments corresponding to the technical features in the respective aspects described in the summary of the present disclosure can be appropriately replaced or combined with each other in order to solve some or all of the above-described problems or in order to achieve some or all of the above-described effects. Further, if the technical features are not described as essential in the present specification, they can be deleted as appropriate.

What is claimed is:

1. A control system configured to control movement of a mobile object that is configured to be conveyed by unmanned driving at least in a manufacturing process, the control system comprising:

a processor configured to include a stop position identification section configured to identify a stop position at which the mobile object is stopped on a conveying part of a conveyance apparatus including the conveying part configured to convey the mobile object; and a control command section configured to generate and output a control command to cause the mobile object to enter the conveying part according to the stop position, wherein the stop position identification section is configured to:

identify a plurality of candidate stop positions corresponding to a plurality of wheel stops provided on the conveying part;

acquire obstacle information indicating presence or absence of an obstacle at each of the candidate stop positions; and select the stop position among the plurality of candidate stop positions according to the presence or absence of the obstacle.

2. The control system according to claim 1, wherein the control command section is configured to generate and output a control command to control at least one of timing of causing the mobile object to enter the conveying part and a speed of the mobile object.

3. The control system according to claim 2, wherein when a distance between the conveyance start position at which the conveyance of the mobile object by the conveying part is started and the stop position is larger than a preset threshold value, the control command section is configured to generate and output a control command to cause the mobile object to enter the conveying part.

4. The control system according to claim 2, wherein when a distance between the conveyance start position at which the conveyance of the mobile object by the conveying part is started and the stop position is equal to or less than a preset threshold value, the control command section is configured to generate and output a control command to stop the mobile object for a preset time.

5. The control system according to claim 1, wherein the control command section is configured to generate and output a control command to stop movement of the mobile object depending on a state of the mobile object on the conveying part.

6. The control system according to claim 1, further comprising a conveyance control section configured to stop driving of the mobile object by the conveying part depending on a state of the mobile object on the conveying part.

7. A control method that controls movement of a mobile object that is configured to be conveyed by unmanned driving at least in a manufacturing process, the control method comprising:

identifying a stop position at which the mobile object is stopped on a conveying part of a conveyance apparatus including the conveying part configured to convey the mobile object;

generating and outputting a control command to cause the mobile object to enter the conveying part according to the stop position;

wherein the identifying the stop position comprises:

identifying a plurality of candidate stop positions corresponding to a plurality of wheel stops provided on the conveying part;

acquiring obstacle information indicating presence or absence of an obstacle at each of the candidate stop positions; and selecting the stop position among the plurality of candidate stop positions according to the presence or absence of the obstacle.

8. A control system configured to control movement of a mobile object that is configured to be conveyed by unmanned driving at least in a manufacturing process, the control system comprising:

a processor configured to include a stop position identification section configured to identify a stop position at which the mobile object is stopped on a conveying part of a conveyance apparatus including the conveying part configured to convey the mobile object; and a control command section configured to generate and output a control command to cause the mobile object to enter the conveying part according to the stop position, wherein the stop position identification section is configured to:

identify a plurality of candidate stop positions corresponding to a plurality of wheel stops provided on the conveying part;

acquire obstacle information indicating presence or absence of an obstacle at each of the candidate stop positions; and select the stop position among the plurality of candidate stop positions according to the presence or absence of the obstacle, and wherein the stop position identification section is configured to:

when no obstacle is present at any one of the candidate stop positions, identify, as the stop position, the candidate stop position that is located farthest from a conveyance start position where the conveyance of the mobile object by the conveying part is started, among the plurality of candidate stop positions, and when the obstacle is present at any one of the candidate stop positions, identify, as the stop position, the candidate stop position located immediately before the candidate stop position at which the obstacle located closest to the conveyance start position is present as viewed from the conveyance start position, among the plurality of candidate stop positions.

\* \* \* \* \*